United States Patent [19]

Nakagawa et al.

[11] Patent Number: 4,754,340
[45] Date of Patent: Jun. 28, 1988

[54] METHOD OF REPRODUCING A CHROMINANCE SIGNAL FROM A PREVIOUSLY LOW-RANGE-CONVERTED CHROMINANCE SIGNAL USING COMB FILTERING AND SAMPLING

[75] Inventors: Yukio Nakagawa, Moriguchi; Masao Tomita, Neyagawa; Tokikazu Matsumoto, Osaka, all of Japan

[73] Assignee: Matsushita Electric Industrial Co., Ltd., Osaka, Japan

[21] Appl. No.: 666,375

[22] Filed: Oct. 30, 1984

[30] Foreign Application Priority Data

| Nov. 1, 1983 | [JP] | Japan | 58-205108 |
| Dec. 2, 1983 | [JP] | Japan | 58-228720 |
| Dec. 16, 1983 | [JP] | Japan | 58-235660 |
| Dec. 16, 1983 | [JP] | Japan | 59-238449 |
| Dec. 24, 1983 | [JP] | Japan | 58-249404 |
| Feb. 8, 1984 | [JP] | Japan | 59-22223 |

[51] Int. Cl.⁴ .............................................. H04N 9/83
[52] U.S. Cl. .................... 358/326; 358/324; 358/329; 358/310
[58] Field of Search ............... 358/326, 310, 315, 316, 358/318, 320, 324, 329, 330; 360/10.3, 11.1

[56] References Cited

U.S. PATENT DOCUMENTS

| 3,872,497 | 3/1975 | Amery et al. | 358/329 |
| 3,872,498 | 3/1975 | Pritchard | 358/329 X |
| 3,938,179 | 2/1976 | Amery | 358/329 |
| 3,968,514 | 7/1976 | Narahara et al. | 358/310 X |
| 3,969,757 | 7/1976 | Amery | 358/310 X |
| 3,996,610 | 12/1976 | Kawamoto | 358/329 X |
| 4,051,517 | 9/1977 | Hjortzberg | 358/310 X |
| 4,110,761 | 8/1978 | Watatani | 358/326 |
| 4,145,705 | 3/1979 | Yoshinaka | 358/326 X |
| 4,200,881 | 4/1980 | Carnt et al. | 358/326 |
| 4,204,220 | 5/1980 | Rutishauser | 358/324 |
| 4,220,964 | 9/1980 | Yamagiwa et al. | 358/329 X |
| 4,258,384 | 3/1981 | Tatami | 358/324 |
| 4,326,216 | 4/1982 | Jensen | 358/326 |
| 4,374,396 | 2/1983 | Hausdorfer | 360/10.3 X |
| 4,396,953 | 8/1983 | Fujita et al. | 358/328 |
| 4,400,742 | 8/1983 | Yamamitsu et al. | 358/318 |
| 4,496,992 | 1/1985 | Sugiyama | 358/326 |
| 4,531,149 | 7/1985 | Lewis, Jr. | 358/326 X |
| 4,549,225 | 10/1985 | Watanabe | 358/316 |
| 4,584,613 | 4/1986 | Amari et al. | 358/310 |

Primary Examiner—Raymond F. Cardillo
Assistant Examiner—Wayne R. Young
Attorney, Agent, or Firm—Wenderoth, Lind & Ponack

[57] ABSTRACT

A low-range-converted chrominance signal is demodulated into two color difference signals. The two color difference signals are each filtered by a comb filter to eliminate undesired components. The two color difference signals, having been filtered, are modulated to obtain a carrier chrominance signal having a prescribed carrier frequency. To be suitable for digital signal processing, the low-range-converted chrominance signal is sampled at a first frequency which is an integral multiple of a low-range-converted carrier frequency of the low-range-converted chrominance signal when being demodulated. The two color difference signals are sampled at a second frequency which is an integral multiple of the prescribed carrier frequency of the carrier chrominance signal.

13 Claims, 28 Drawing Sheets

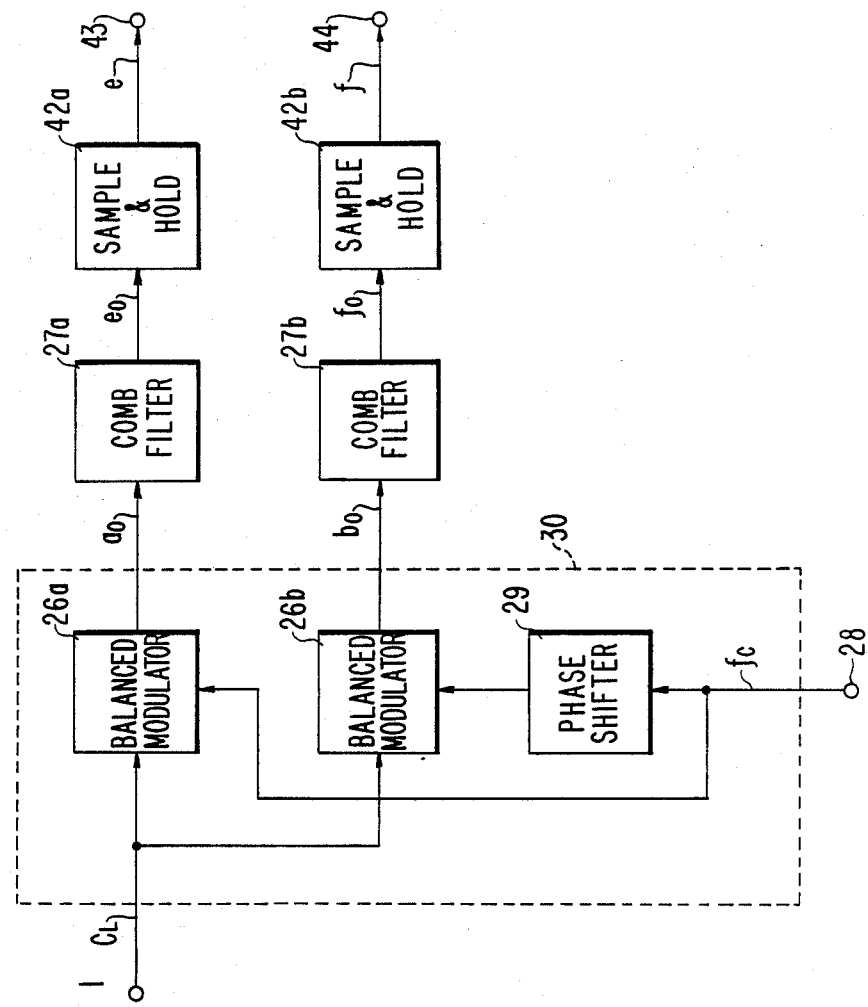

FIG. 33

| CLS | $a$ | $a/\sqrt{2}+b/\sqrt{2}$ | $b$ | $-a/\sqrt{2}+b/\sqrt{2}$ | $-a$ | $-a/\sqrt{2}-b/\sqrt{2}$ | $-b$ | $a/\sqrt{2}-b/\sqrt{2}$ |
|---|---|---|---|---|---|---|---|---|
| CLS−1 | $a/\sqrt{2}-b/\sqrt{2}$ | $a$ | $a/\sqrt{2}+b/\sqrt{2}$ | $b$ | $-a/\sqrt{2}+b/\sqrt{2}$ | $-a$ | $-a/\sqrt{2}-b/\sqrt{2}$ | $-b$ |
| i | 1 | 0 | −1 | $-\sqrt{2}$ | −1 | 0 | 1 | $\sqrt{2}$ |
| j | 0 | 1 | $\sqrt{2}$ | 1 | 0 | −1 | $-\sqrt{2}$ | −1 |
| aLSi+ aLS−1j | $a$ | $a$ | $a$ | $a$ | $a$ | $a$ | $a$ | $a$ |
| k | −1 | $\sqrt{2}$ | 1 | 0 | −1 | $\sqrt{2}$ | 1 | 0 |
| l | $-\sqrt{2}$ | −1 | 0 | 1 | $\sqrt{2}$ | 1 | 0 | −1 |
| CLSk+ CLS−1l | $b$ | $b$ | $b$ | $b$ | $b$ | $b$ | $b$ | $b$ |

METHOD OF REPRODUCING A CHROMINANCE SIGNAL FROM A PREVIOUSLY LOW-RANGE-CONVERTED CHROMINANCE SIGNAL USING COMB FILTERING AND SAMPLING

BACKGROUND OF THE INVENTION

1. Field of the invention

The present invention relates to a method of reproducing a chrominance signal in converting a low-range-converted chrominance signal from a recording medium into a carrier chrominance signal having a prescribed carrier frequency or demodulating the low-range-converted chrominance signal into a color difference signal so that the low-range-converted chrominance signal can be reproduced on a television receiver or the like. The method of the invention is suitable for use in signal reproducing systems such as video disc players or video tape recorders (VTR) for reproducing video signals from recording mediums such as video discs in which a chrominance signal in a video signal is recorded with a high packing density at a low-range conversion carrier frequency or video tapes in which a carrier chrominance signal is converted in a low frequency range and recorded

2. Description of the Prior Art

Most conventional video signal reproducing apparatus for home use reproduce video signals from recording mediums in which a carrier chrominance signal is converted into a low frequency range and recorded by frequency multiplexing below a luminance signal band which is frequency-modulated. Such a video signal recording system is referred to as a so-called "color-under" system.

FIG. 1 of the accompanying drawings shows in block form an arrangement for carrying out a conventional method of reproducing a chrominance signal.

A low-range-converted chrominance signal recorded in the color-under system is applied as a signal $C_L$ through a terminal 1, and processed by a balanced modulator 2, a comb filter 3, and a bandpass filter 4 into a carrier chrominance signal Csc having a carrier frequency equal to a chrominance subcarrier frequency fsc of a television signal, the carrier chrominance signal Csc being available through a terminal 5. Where an NTSC television signal is to be reproduced by a VHS-VTR, for example, a carrier to be applied to the balanced modulator 2 has a frequency fsc+fc=4.2 MHz and is produced via a bandpass filter 7 by a balanced modulator 6 which adds a low-range conversion carrier (having a frequency fc=629 KHz) and a carrier (having a frequency fsc=3.58 MHz).

FIGS. 2(a)–2(c) are a set of spectrum diagrams showing the manner in which frequency conversion is carried out. FIG. 2(a) shows a spectrum of the low-range-converted carrier chrominance signal $C_L$ which has a frequency band of ±500 KHz with a central frequency of 629 KHz. FIG. 2(b) shows a spectrum of an output signal of the balanced modulator 2, including the difference between and the sum of frequency components of the conversion carrier fsc+fc (4.2 MHz) and the signal $C_L$, the difference being indicated by Csc and the sum by C'sc. The signal Csc which is required is picked up by the bandpass filter 4 having characteristics shown in FIG. 2(c). Since the signal C'sc which is an upper side band causes disturbance, the bandpass filter 4 is required to have sharp cutoff characteristics in a high frequency range. The bandpass filter 4 is also required to have cutoff characteristics for sufficiently attenuating the component fsc+fc since a carrier leak may be produced dependent on the characteristics of the balanced modulator 2.

Therefore, the conventional arrangement has required two balanced modulators 2, 6 and two bandpass filters 4, 7 for converting the low-range-converted chrominance signal into the carrier frequency, resuling in an increased circuit area and an increased number of circuit components needed. In addition, inasmuch as the bandpass filter 4 should have sharp cutoff characteristics, the band of a reproduced chrominance signal is narrowed to cause iamge degradation such as a color blur. A large group delay distortion is produced within the pass band of the filter, also causing image degradation. With the conventional chrominance reproducing method shown in FIG. 1, the bandpass filter 4 used in conversion into the carrier chrominance signal has been required to have high performance and has been one of major causes of chrominance signal degradation.

When it is necessary to issue a reproduced chrominance signal in a base band, the conversion carrier fsc+fc may be selected to be fc and the bandpass filter 4 may be replaced with a low-pass filter for passing the base band. However, the low-pass filter should have sharp cutoff characteristics for removing an upper side band component of the carrier fc which appears in addition to the chrominance signal in the base band, and such a low-pass filter is responsible for deteriorated images.

The comb filter 3 serves to remove crosstalk components from adjacent tracks in the VTR or the like. Where an NTSC television signal is to be reproduced on a VHS-VTR, the low-range conversion carrier in each track is advanced or delayed 90° in phase in each horizontal period so that crosstalk components in the signal having passed through the balanced modulator will be brought into phase with each other in one horizontal period (this phase shifting will be referred to as an "NTSC-PS process"). On Beta-VTR or 8 mm-VTR, the low-range-converted chrominance signal is inverted in phase in each horizontal period to cancel crosstalk components (this phase inversion will be referred to as an "NTSC-PI process"). Where a PAL television signal is to be reproduced, the low-range conversion carrier in one of adjacent tracks is advanced or delayed 90° in phase so that crosstalk components will be brought into phase with each other in every two horizontal periods (this phase shifting will be referred to as a "PAL-PS process").

FIG. 3 is a frequency spectrum of a signal prior to passing through the comb filter 3 at the time the carrier chrominance signal of an NTSC television signal is to be reproduced. Since crosstalk components are shifted by $f_H/2$ with respect to a carrier chrominance signal spectrum indicated by the solid-line arrows, and the frequency fsc is 455/2 $f_H$, the crosstalk components are removed by the characteristics, indicated by the solid line, of a comb filter composed of a 1-H delay line and a subtractor.

The 1-H delay line in the prior comb filter 3 comprises a glass delay line. Because the delay needed is large, i.e., one horizontal period (or two horizontal periods for PAL), and the delay should accurately be 1 H or 2 H, and also because the delay line is required to have a band of the carrier chcominance signal, the glass delay line is expensive and has an increased area. Inasmuch as the delay achieved by the glass delay line is constant, the comb filter will be ineffective if the spectrum of the carrier chrominance signal is shifted due to a deviation of the carrier frequency fsc of the carrier chrominance signal or jitter of the reproduced chrominance signal.

The carrier fsc supplied to the balanced modulator 6 is generated by a reference oscillator 8 of good characteristics employing a piezoelectric crystal. The low-range conversion carrier fc is produced by extracting a burst of the carrier chrominance signal Csc after being converted in frequency through a burst gate 9, comparing the phases of the extracted burst and the carrier fsc from the reference oscillator 8 with a phase comparator 10, applying the result of comparison through a low-pass filter to a voltage-controlled oscillator 12, and frequency-dividing an output signal from the voltage-controlled oscillator 12 and effecting the PS and PI processes on the output signal in a signal generating circuit 13. The voltage-controlled oscillator 11 is normally operated at a frequency which is four times the low-range conversion carrier. Generally, m is selected as an integer, a frequency mfc from the voltage-controlled oscillator 12 is frequency-divided into a frequency fc, and the signal is subjected to the PS and PI processes in each horizontal period using a horizontal synchronizing signal $f_H$ from a terminal 14 as a reference. A signal PG from a terminal 15 is a signal for discriminating tracks and is used as a switching signal for delaying or advancing the low-range conversion carrier fc in phase in each horizontal period when the NTSC-PS process, for example, is to be performed. As described above, a phase-locked loop is constituted by producing the low-range conversion carrier fc, and the burst of the carrier chrominance signal Csc is in synchronism with the carrier fsc issued from the reference oscillator 8.

There has been a demand in recent years for digital signal processing in the foregoing chrominance signal reproducing method and for making the parts such as the comb filter 3 of a semiconductor to render the circuit arrangement small in size and achieve a low power requirement. However, it has been difficult to produce a digital circuit arrangement since the frequencies used are high, and such a digital arrangement would be costly to manufacture. Another reason for the difficulty in achieving digital signal processing is that the balanced modulators 2, 6 and the phase comparator 10 operate on analog signal processing.

SUMMARY OF THE INVENTION

It is an object of the present invention to provide a chrominance signal reproducing method in which no filter is used or a filter of less strict design requirements is used in converting a low-range-converted carrier chrominance signal into a base band or a prescribed carrier chrominance signal to improve the band of a reproduced chrominance signal and group delay characteristics for thereby improving the quality of reproduced images, and in which digital signal processing can be effected at a low speed, and comb filters can easily be made of a semiconductor, and a processing circuit of a small size and a reduced cost can be employed.

According to a chrominance signal reproducing method of the present invention, a low-range-converted carrier chrominance signal is demodulated and a base-band signal is passed through a holding circuit and a comb filter in converting the low-range-converted carrier chrominance signal into a base-band chrominance signal or a carrier chrominance signal having a prescribed subcarrier frequency, for thereby removing an unwanted side band component and crosstalk from adjacent tracks, which are produced upon demodulation, so that a low-pass or bandpass filter for removing a side band produced by the conversion may be dispensed with or may have less strict characteristics. Furthermore, the carrier chrominance signal is generated by a means for synchronizing the low-range-converted chrominance signal in phase with the low-range coversion carrier, sampling the low-range-converted chrominance signal with a first clock signal having a frequency which is a multiple of that of the low-range conversion carrier, converting the sampled data into two color difference signal sampled data, and synthesizing the two color difference signal sampled data for issuance with a reference clock signal which is n times the carrier frequency of the carrier chrominance signal. With this arrangement, the number of circuit components required is reduced and the circuit components can easily be made of a semiconductor.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a block diagram for a circuit arrangement for demodulating a low-range-converted chrominance signal into color difference signals on analog signal processing;

FIG. 13 is a block diagram of a circuit arrangement according to the present invention, in which sampleand-hold circuits are added to the circuit arrangement of FIG. 7;

FIG. 33 is a computation table for computing first two color difference signal sampled data from low-range-converted chrominance signal sampled data when a first clock signal frequency is eight times the low-range-converted carrier frequency.

DESCRIPTION OF THE PREFERRED EMBODIMENTS

Figure 4:
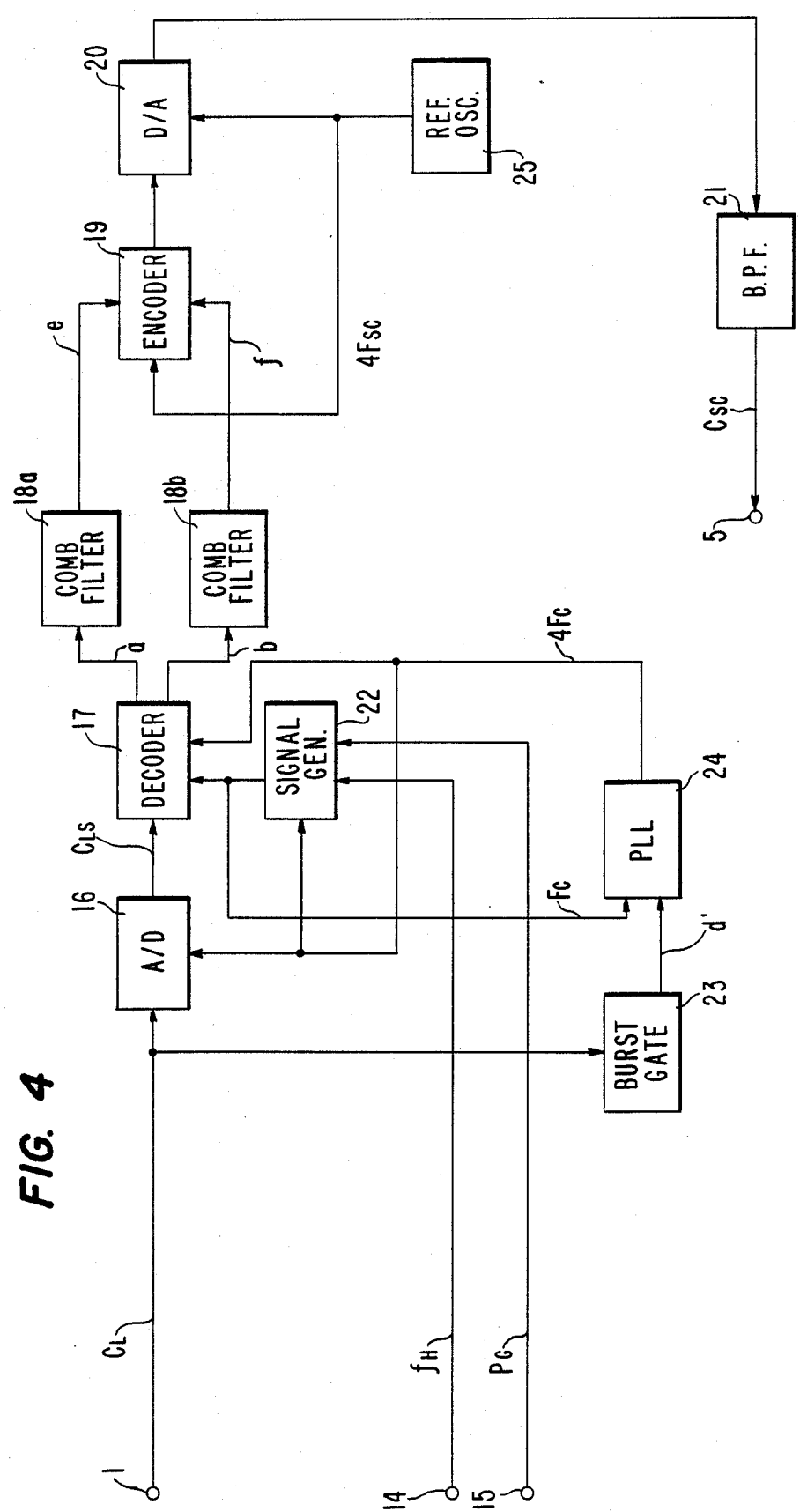
FIG. 4 is a block diagram of an arrangement for carrying out a chrominance signal reproducing method according to an embodiment of the present invention.

FIG. 4 shows in block form a circuit arrangement for effecting a method of reproducing a chrominance signal according to the present invention. The circuit arrangement includes a terminal 1 supplied with a low-range-converted chrominance signal $C_L$, a terminal 14 supplied with a horizontal synchronizing signal $f_H$, a terminal 15 supplied with a track discriminating signal PG, an A/D converter 16 for converting the low-range-converted chrominance signal from the terminal 1 into digital data, a decoder 17 for demodulating the digital data into two color difference signal data, comb filters 18a, 18b each composed of a random-access memory or a shift register for storing input data, and reading data one horizontal period prior to the stored data, adding the input data, and issuing the sum data, an encoder 19 for converting the color difference signal data from the comb filters 18a, 18b into carrier chrominance signal data of a prescribed carrier frequency, a D/A converter 20 for converting the carrier chrominance signal into an analog carrier chrominance signal, a bandpass filter 21, a signal generating circuit 22 for producing a pulse signal Fc (having a frequency fc) which is identical in frequency and phase to a low-range conversion carrier based on the horizontal synchronizing signal $f_H$, the track discriminating signal PG, and a first clock 4Fc having a frequency 4fc which is four times the carrier frequency fc of the low-range-converted chrominance signal, a burst gate 23 for extracting a burst from the low-range-converted chrominance signal, a phase-locked loop (PLL) circuit 24 for generating a succession of clocks 4Fc from the burst extracted by the burst gate 23, and a reference oscillator 25 employing a piezoelectric crystal. A carrier chrominance signal having a reference chrominance subcarrier frequency fsc is issued from a terminal 5.

Operation of the arrangement of FIG. 4 will be described with particular reference to an application in which the first clock signal which is a sampling clock signal for the low-range converted chrominance signal is a clock signal 4Fc having a frequency that is four times the frequency fc of the low-range conversion carrier.

Figure 5:
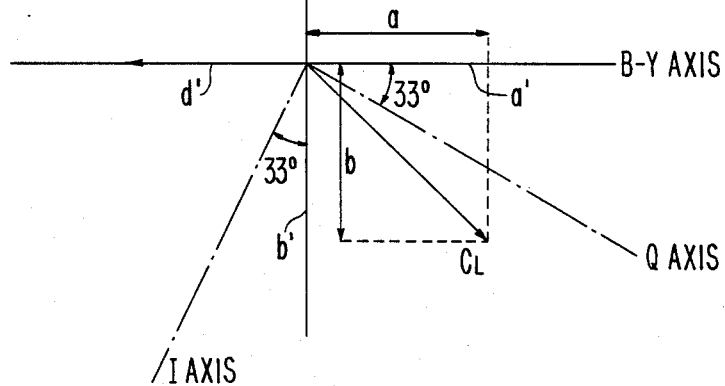
FIG. 5 is a vector diagram of a low-range-converted chrominance signal $C_L$ in FIG. 4.
Figure 6:
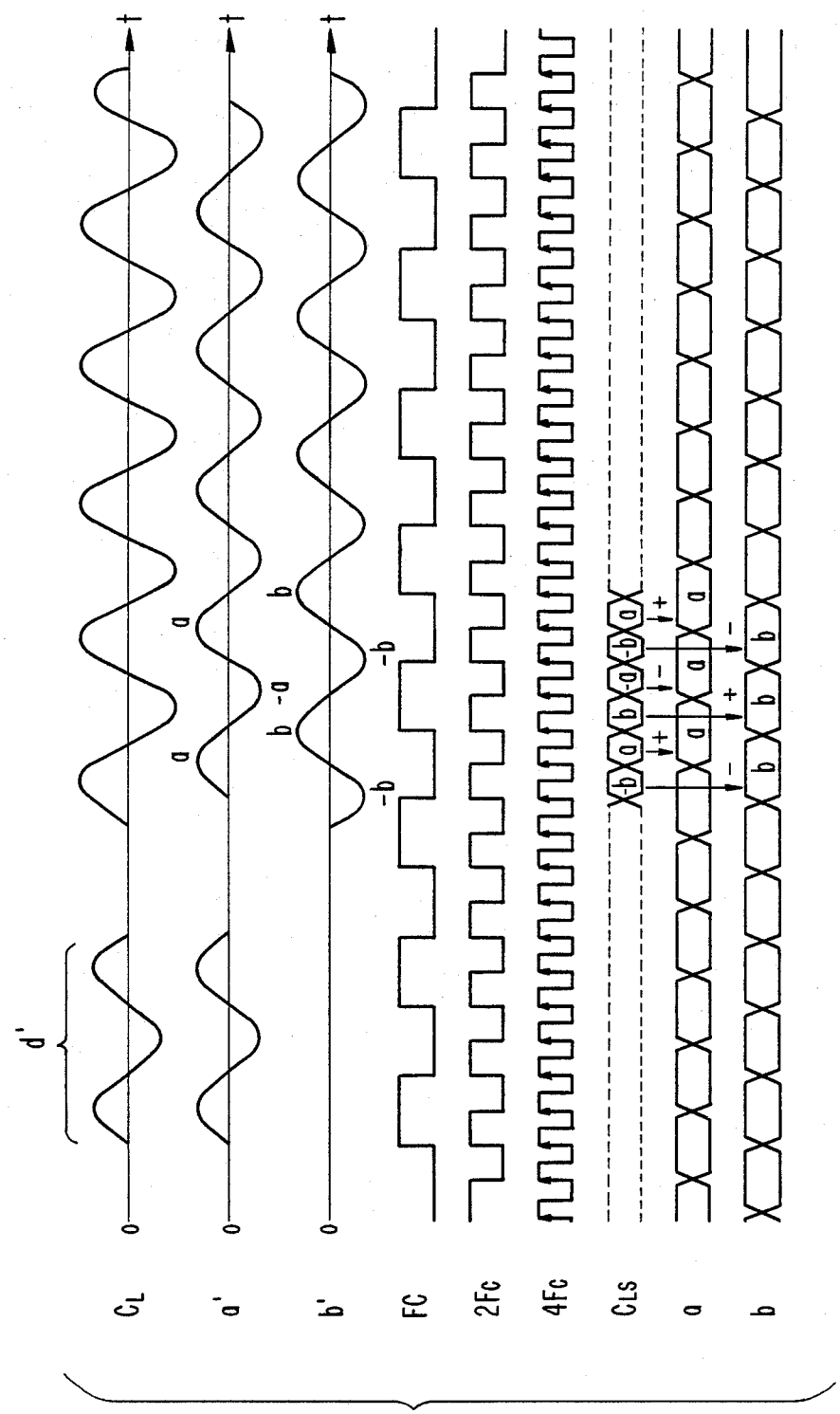
FIG. 6 is a timing diagram showing signal waveforms in the arrangement of FIG. 4.

FIG. 5 shows a vector of the low-range-converted chrominance signal in which two color difference signals are subjected to quadrature two-phase balanced modulation, the vector being the sum of balanced modulation signals a', b' which are 90° out of phase with each other. Designated at d' in FIG. 4 is the vector of a low-range-converted burst. FIG. 6 shows the waveforms of the signals a', b', $c_L$ and the burst d', and the timing of various clock signals and data. Where an A/D convertion clock signal is converted into a digital signal by the clock signal 4Fc synchronous in phase with the burst d' of the low-range-converted chrominance signal, the A/D converter 16 issues output digital data $C_{LS}$ composed of an alternate series of color difference signals a, b and signals having inverted positive and negative signs of the color difference signals a, b. The signal generating circuit 22 produces pulses Fc identical in frequency and phase to the low-range-converted burst d' from the clock signal 4Fc synchronous with the burst phase. With the clock signals Fc, 4Fc, and a clock signal 2Fc which is twice Fc being used as references, the decoder 17 separates the digital data $C_{LS}$ into two sets of color difference signal data a, −a, and b, −b, and at the same time converts the signal data into two color difference signal data a, b by inverting the positive and negative signs of the two sets of color difference signal data a, −a, and b, −b at the timing of the clock signal 2 Fc. The color difference signal data a, b are added to data 1 H prior to the data by the comb filters 18a, 18b, which produce color difference signal data e, f supplied to the encoder 19. The encoder 19 produces data $-e$, $-f$ having inverted signs of the data e, f, and successively issues these data f, e, $-f$, $-e$ in the order named with a second clock signal 4 Fsc having a frequency of 4 fsc. The carrier chrominance signal issued from the encoder 19 has a carrier frequency equal to a reference frequency fsc free from jitter. The carrier chrominance signal data is converted by the D/A converter 20 into an analog signal which is fed to the bandpass filter 21 which removes harmonics produced by digital signal processing and which generates a carrier chrominance signal having a prescribed carrier frequency fsc.

The PLL circuit 24 serves to generate the A/D conversion clock signal 4Fc and operates to synchronize the low-range-converted burst d' extracted by the burst gate 23 in phase with the clock signal Fc.

In the foregoing description, the clock signal having a frequency which is four tiems that of the low-range-converted burst is used as the first clock, the low-range-converted chrominance signal is sampled with the first clock signal and converted into the two color difference signal data, and the two color difference signals are synthesized with the second clock, that is, the reference clock signal having a frequency which is four times the carrier frequency fsc of the carrier chrominance signal. According to the present invention, however, a clock signal having a frequency which is N times the low-range conversion carrier frequency fsc may be used as the first clock for sampling the low-range-converted chrominance signal to produce two color difference signal data, and the two color difference signal data may be synthesized or combined into a prescribed carrier chrominance signal with a reference clock signal which is n times the carrier frequency fsc of the carrier chrominance signal. Where F=8, for example, data corresponding to $C_{LS}$ shown in FIG. 6 comprise, rather than a repetition of four data items: a, b, $-a$, $-b$, a repetition of eight data items: a, $a/\sqrt{2}+b/\sqrt{2}$, b, $-a/\sqrt{2}+b/\sqrt{2}$, $-a$, $-a/\sqrt{2}-b/\sqrt{2}$, $-b$, $a/\sqrt{2}-b/\sqrt{2}$ (which can be expressed generally by [a sin(0°+(N−N')/N×360°)+b sin(90°+(N−N')/N×360°] where N' is an integer ranging from 0 to N). The data items a, b can be separated from the above combined data by multiplying one data $C_{LS}$ and data $C_{LS-1}$ one clock pulse prior thereto by repetition constants i, j or k, l and adding the products. For example, the data items can be determined as shown in FIG. 33.

In case the clock signal having the frequency Nfc which is N times the low-range conversion carrier frequency fc is used as the first clock signal as described above, it is possible to calculate the data items from the sampled data $C_{LS}$, $C_{LS-1}$ or from several data such as $C_{LS+1}$, $C_{LS}$, $C_{LS-1}$. Where N−4, the data items can be generated simply by inverting the signs of the data, and no crosstalk is produced. For sampling a signal, it is required to be sampled by a clock signal having a frequency which is at least twice the frequency of the signal. Therefore, the maximum frequency of the frequency spectrum of the low-range-converted chrominance signal is required to be twice the frequency of the low-range-converted burst, and the sampling clock signal is required to be four times the frequency fc of the low-range-converted burst.

The two color difference signal data can be converted into the carrier chrominance signal having the prescribed carrier frequency fsc in a process which is substantially a reversal of the operation in which the low-range-converted chrominance signal is sampled by the clock signal of the freuqency Nfc for coversion into the color difference signal data. For example, where a clock signal having a frequency which is three times (n=3) the carrier frequency is used as the second clock signal, three data expressed by:

$$e \sin 0° + f \sin 90° = f$$

$$e \sin 120° + f \sin 210° = \sqrt{3}/2e - \tfrac{1}{2}f$$

$$e \sin 240° + f \sin 330° = -\sqrt{3}/2e - \tfrac{1}{2}f$$

(generally expressed by e sin (0°+(n−n')/n)+f sin (90°+(n−n')/n) where n' is an integer in the range of from 0 to n)
are calculated and repeatedly issued. Where n=4 in the same manner as when the low-range-converted chrominance signal is converted into the two color difference signal data, the following four data are repeated:

$$e \sin 0° + f \sin 90° = f$$

$$e \sin 90° + f \sin 180° = e$$

$$e \sin 180° + f \sin 270° = -f$$

$$e \sin 270° + f \sin 360° = -e$$

Therefore, the carrier chrominance signal data can be synthesized or combined simply by inverting the positive and negative signs of the two color difference signals and issuing the data items alternately.

With the foregoing arrangement, as described above, a low-range-converted chrominance signal is once demodulated on a digital basis and then digitally modulated for frequency conversion, thus dispensing with any band pass filter which would have been required with a balanced modulator for extracting an upper or lower side band. It is not necessary to effect high-speed digital processing for digitally processing the low-range-converted chrominance signal or demodulated color difference signals which are in a relatively low frequency range. Therefore, the arrangement of the invention can easily be designed for digital signal processing. Where a clock signal having a frequency which is four times the carrier frequency fc is used as the first clock, two color difference signals can be separated by a process for inverting the positive and negative signs of sampled data and a simple piece of hardware for sampling data with clock signals which are of a frequency that is ½ of that of the sampling clock signal and which are 180° out of phase with each other. Where the two color difference signals are to be converted into the prescribed carrier chrominance signal data, the reference clock signal is caused to have a frequency which is four times the carrier frequency of the carrier chrominance signal to invert the positive and negative signs of the two color difference signals, and the resultant data items are alternatly issued. Therefore, the conversion from the two color difference signal data into the carrier chrominance signal data can also be achieved by simple hardware. Since the two color difference signals of a low frequency are passed through the comb filters, they may be replaced with low-speed semiconductor memories. As a consequence, the circuit arrangement can be reduced in size.

FIG. 7 shows in block form an arrangement for demodulating a low-range-converted chrominance signal into two color difference signals with balanced modulators, rather than sampling the low-range-converted chrominance signal with the A/D converter and the decoder.

A low-range-converted chrominance signal $C_L$ fed from a terminal 1 is applied to balanced modulators 26a, 26b which issue output signals converted by comb filters 27a, 27b into base band signals eo, fo which are available via terminals 31, 32. The signals eo, fo are B-Y, R-Y components of color difference signals, for example. The balanced modulators 26a, 26b are supplied from a terminal 28 with a signal having a subcarrier frequency fc of the low-range-converted carrier chrominance signal $C_L$, the signal applied to the balanced modulator 26b being shifted 90° in phase by a phase shifter 29. The balanced modulators 26a, 26b and the phase shifter 29 constitute a chrominance demodulator 30.

Figure 8:
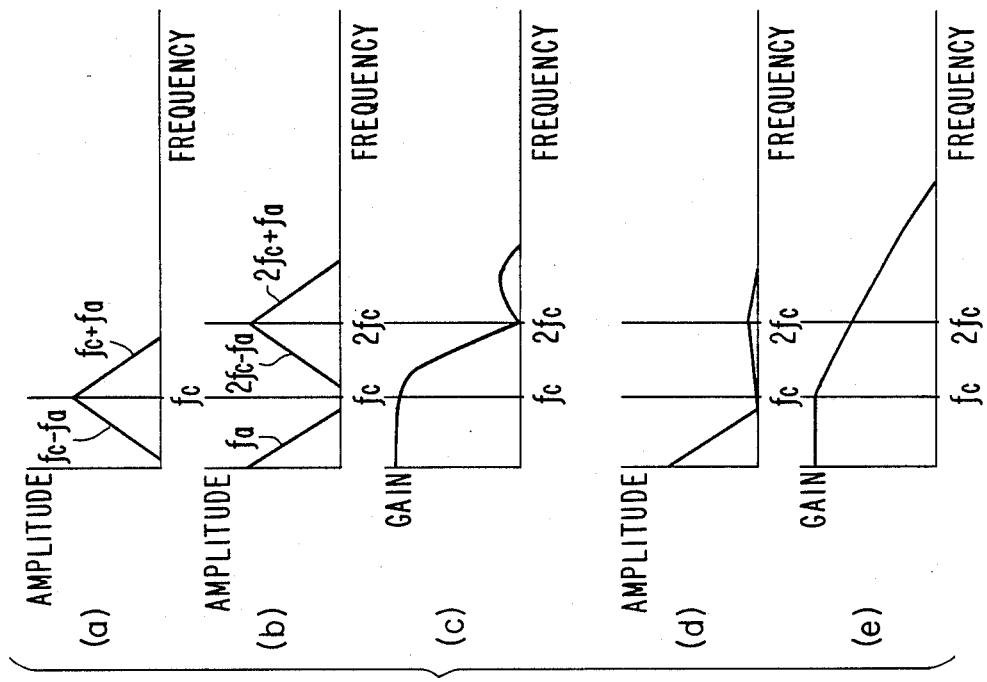
FIGS. 8(a)-8(e) are a set of diagrams of frequency spectrums illustrative of the operation of the circuit arrangement of FIG. 7.

FIGS. 8(a)-8(e) are illustrative of the operation of the arrangement of FIG. 7. Assuming that a base band chrominance signal which is an original signal is expressed by fa, the low-range-converted chrominance signal $C_L$ is composed of a frequency fc, an (fc−fa) component, and an (fc+fa) component as shown in FIG. 8(a). Since the low-range-converted chrominance signal $C_L$ and the low-range conversion carrier fc from the terminal 28 are applied to the balanced modulator 26a, the balanced modulator 26a produces an output signal ao composed of the difference between and the sum of the signals $C_L$ and fc as shown in FIG. 8(b), producing the base band signal fa and (2fc−fa) and (2fc+fa) components which are upper side band components of fc. (Since the balanced modulator 26b operates in the same manner except that the phase of fc is shifted 90°, operation of the balanced modulator 26b will be omitted.) When the base band signal fa is to be extracted, the output signal ao would be passed through a low-pass filter having characteristics shown in FIG. 8(c). Since the unwanted upper side band has a large amplitude, however, the low-pass filter would have to have sharp cutoff characteristics which would degrade reproduced images.

According to the present invention, the output signal from the balanced modulator 26a is passed through the comb filter 27a for solving the above problem.

Figure 9:
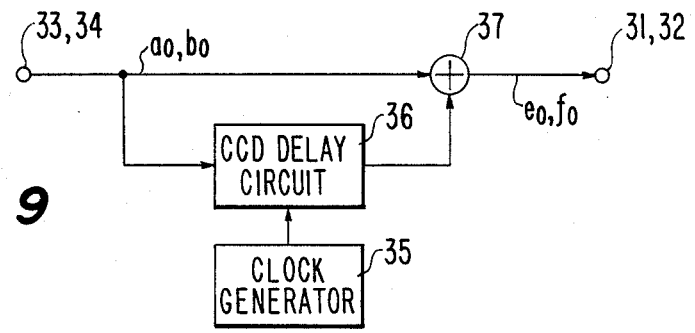
FIG. 9 is a block diagram of a comb filter in FIG. 7.
Figure 10:
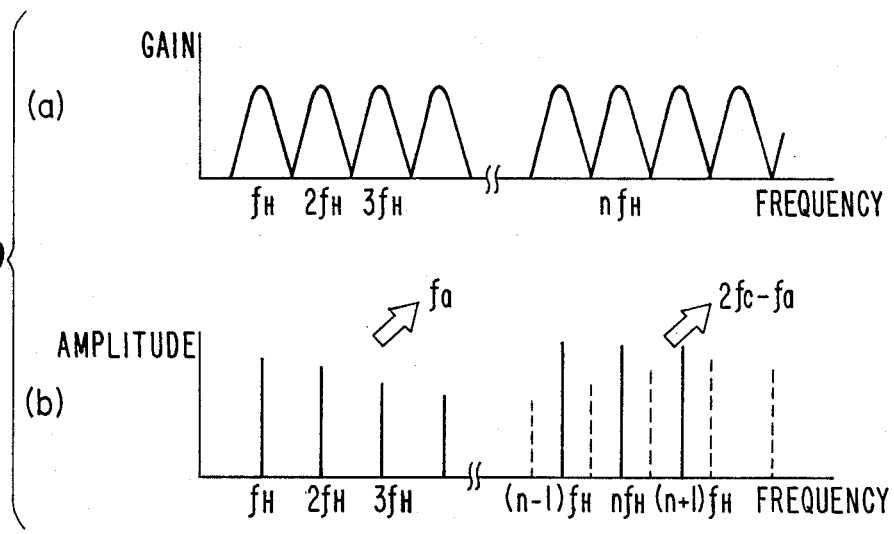
FIGS. 10(a)-10(b) are a set of diagrams of frequency spectrums explanatory of the operation of the comb filter shown in FIG. 9.

FIG. 9 shows a detailed arrangement of the comb filters 27a, 27b shown in FIG. 7. The comb filter is composed of a CCD delay circuit 36 driven by a clock generator 35 and an adder 37. The signal is delayed by the CCD delay circuit 36 for a time period corresponding to one horizontal period of the video signal by appropriately selecting the frequency of the clock generator 35 and the number of charge transfer steps. The adder 37 has an output terminal 31, 32 for producing a signal indicative of the sum of an input signal ao, bo from an input terminal 33, 34 and another signal which is one horizontal period delayed from the input signal ao, bo. The arrangement of FIG. 9 has comb filter characteristics as shown in FIG. 10(a) which exhibit gain peaks spaced at intervals equal to a horizontal scanning frequency $f_H$.

The output terminal of the balanced modulator 26a shown in FIG. 7 produces a signal having the spectrum illustrated in FIG. 8(b). The distribution of such spectrum will be analyzed in more detail.

In the color-under recording system, the subcarrier fc of the low-range-converted carrier chrominance signal to be recorded is substantially a multiple of $\frac{1}{4} f_H$ by an odd number. For example, the subcarrier fc in the VHS-VTR which efects the NTSC-PS process is 40 fH which is forty times $f_H$. By advancing or delaying the phase of the low-range-converted carrier by 90° in each horizontal period, the carrier frequency becomes $(40 \pm \frac{1}{4}) f_H$. The subcarrier fc in the Beta-VTR is selected to be $(44 - \frac{1}{4}) f_H$. Therefore, the frequency fc of the conversion carrier to be applied to the balanced modulators 26a, 26b is given by the following equation:

$$fc = \tfrac{1}{4} f_H (2n_1 - 1) \tag{1}$$

$f_H$: horizontal scanning frequency
$n_1$: integer

As a consequence, the demodulated base band signal is expressed by the following equation (2):

$$fa = n_2 f_H \tag{2}$$

$n_2$: integer which exhibits a spectrum distribution having peaks at the intervals of $f_H$, as indicated by fa in FIG. 10(b). The upper side bands 2fc−fa and 2fc+fa of fa are given from the equations (1) and (2), and represented by spectrums indicated by the following equations (3) and (4):

$$2fc - fa = \tfrac{1}{2} f_H (2n_3 - 1) \tag{3}$$

$$2fc + fa = \tfrac{1}{2} f_H (2n_4 - 1) \tag{4}$$

$n_3, n_4$: integer

These spectrums are held in an interleaving relationship to the spectrum of fa as indicated by 2fc−fa in FIG. 10(b). That is, the base band signal fa and the unwanted upper side band component in the output signal from the balanced modulator 26a are in an interleaving relationship to each other. By passing the output signal of the balanced modulator through the comb filter having the characteristics illustrated in FIG. 10(a), the base band signal fa is issued as is from the comb filter, while the unwanted (2fc−fa) and (2fc+fa) components are largely attenuated since their spectrums are in the rejection band of the comb filter. As a consequence, the signal having the spectrum distribution shown in FIG. 8(d) is produced from the output terminal of the comb filter 27a. The signal eo may be picked up directly as the color difference signal B−Y, or may be picked up through a low-pass filter having less sharp characteristics as shown in FIG. 8(e) for further attenuating a remaining upper side band. By thus passing the demodulated base band signal through the comb filter to obtain the base band signal B−Y, the unwanted components can be removed to a large extent, and no low-pass filter is required or a low-pass filter, if used, may be of less sharp characteristics. Accordingly, a chrominance signal having a wide pass band and a small group delay distortion can be reproduced.

While the conversion into the B−Y signal eo has been described above, convertion into the R−Y signal fo can likewise be achieved by the balanced modulator 26b and the comb filter 27b.

Conversion of a reproduced low-range-converted chrominance signal into a prescribed carrier chrominance signal such as a television signal will be described below.

Figure 1:
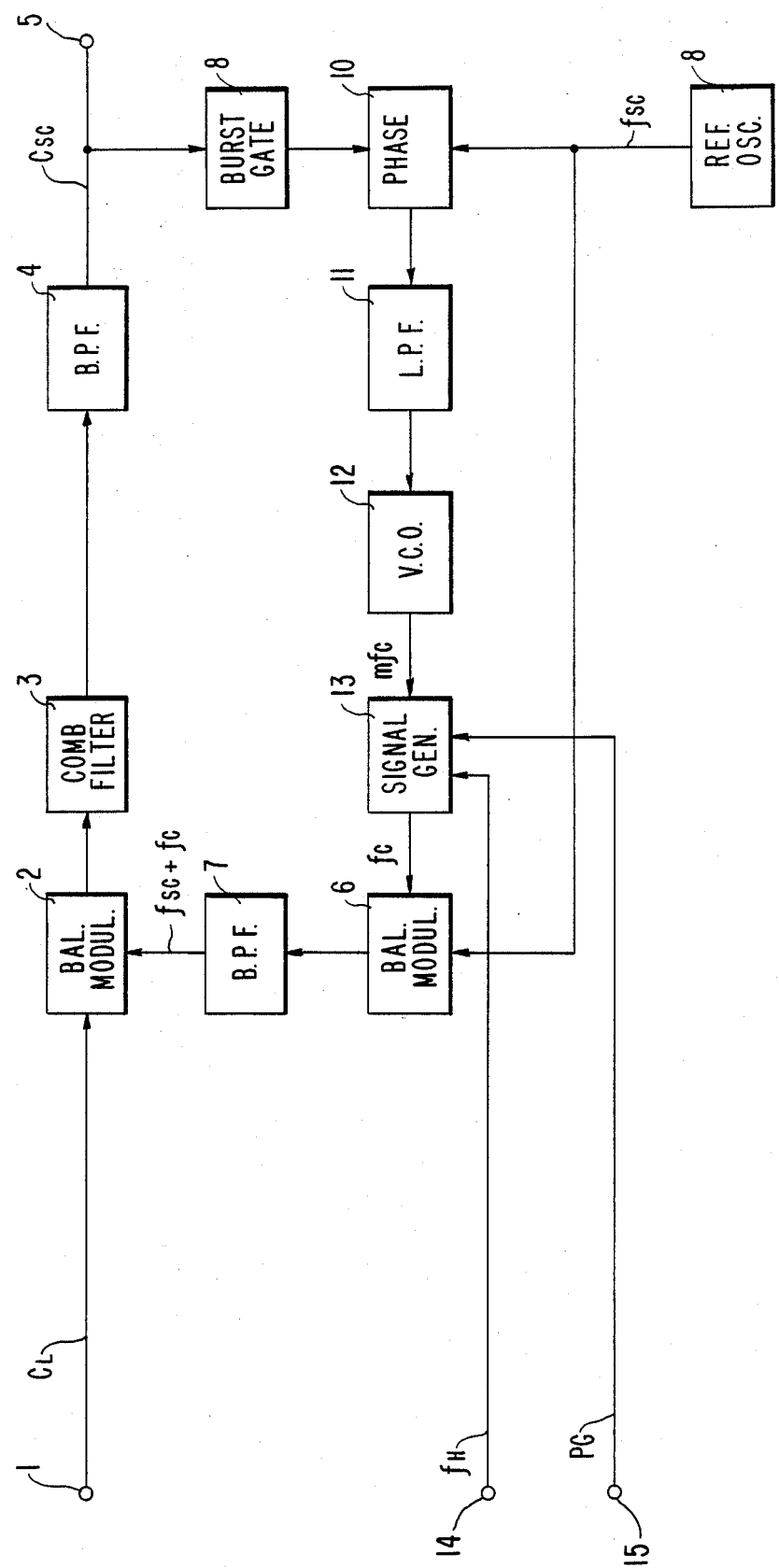
FIG. 1 is a block diagram of an arrangement for effecting a conventional chrominance signal reproducing method.
Figure 11:
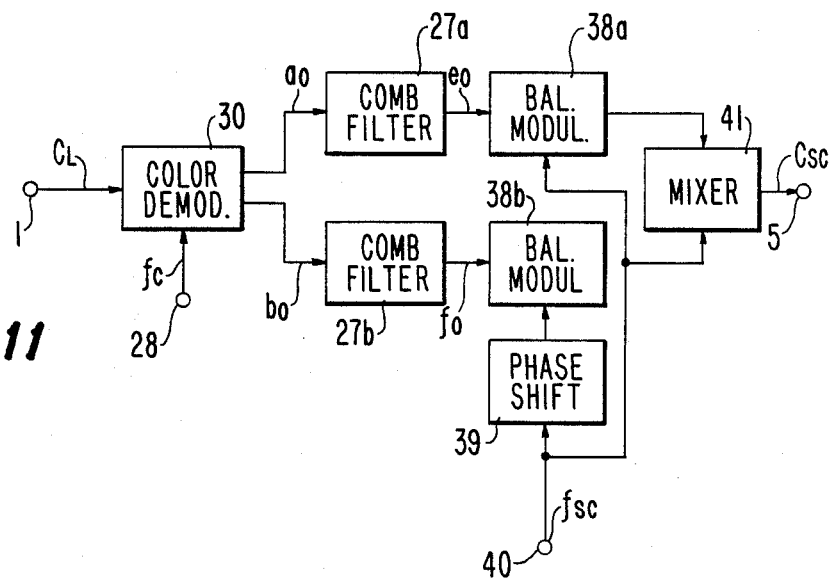
FIG. 11 is a block diagram of a circuit arrangement for modulating a low-range-converted chrominance signal into a carrier chrominance signal on analog signal processing according to the present invention.

FIG. 11 is illustrative of an arrangement for effecting such a conversion. A low-range-converted carrier chrominance signal $C_L$ applied through a terminal 1 is converted by a chrominance demodulator 30 into base band color difference signals based on a low-range conversion carrier fc from a terminal 28. The base band color difference signals are then passed through comb filters 27a, 27b for removing unwanted side bands. Output signals from the comb filters 27a, 27b are then applied respectively to balanced modulators 38a, 38b the output signals from which are mixed by a mixer 41 which issues a carrier chrominance signal Csc to a terminal 5. Conversion carriers applied to the balanced modulators 38a, 38b are signals having carrier frequencies fsc which are 90° out of phase with each other, one such signal being supplied by a phase shifter 39. The carrier fsc supplied to a terminal 40 is the same as the carrier fsc, for example, generated by the reference oscillator 8 in the conventional arrangement of FIG. 1. With the above arrangement, the two color difference signals eo, fo are subjected to quadrature two-phase modulation to produce the carrier chrominance signal Csc available through the terminal 5. For producing a carrier chrominance signal of an NTSC television signal, fsc should be selected to be 3.58 MHz.

Figure 12:
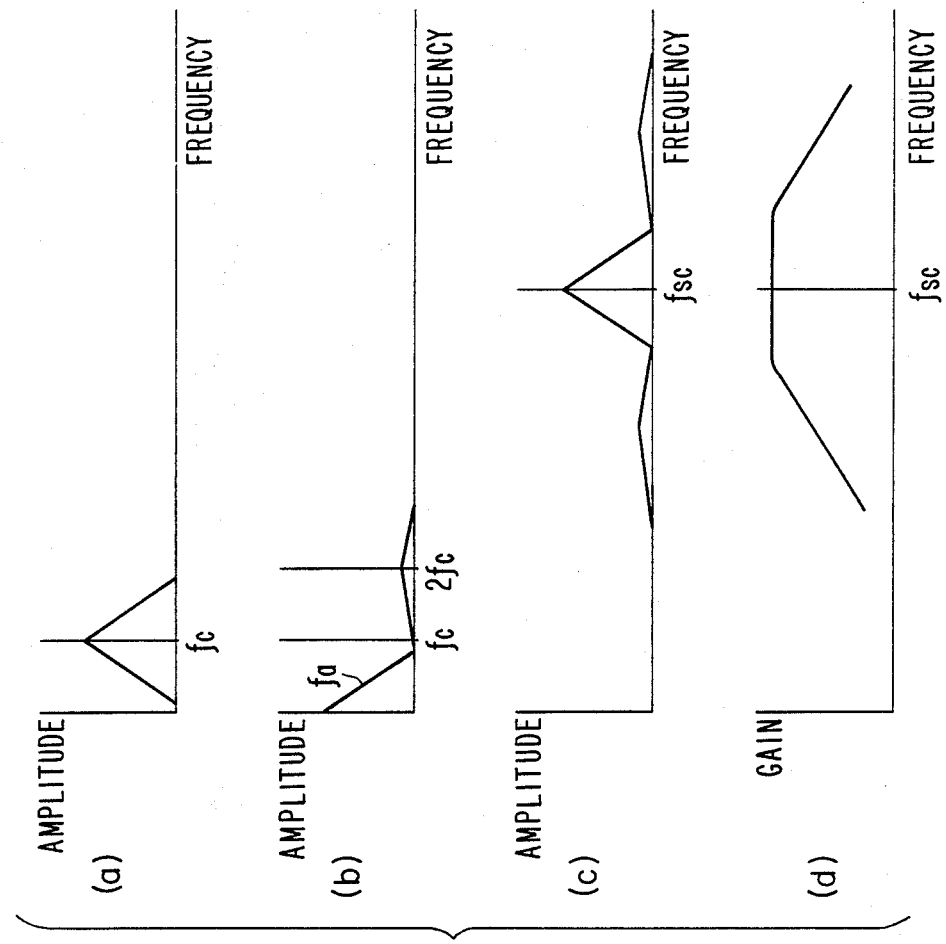
FIGS. 12(a)-12(d) are a set of diagrams of frequency spectrums illustrative of the operation of the circuit arrangement of FIG. 11.

FIG. 12 shows spectrum distributions illustrative of conversion into a carrier chrominance signal. FIG. 12(a) illustrates the spectrum of the input low-range-converted carrier chrominance signal $C_L$ having a central subcarrier frequency fc. FIG. 12(b) shows the spectrum of the signal from the comb filter supplied with the converted base band signal, the signal containing the base band signal fa and a small amount of unwanted side band components which have not been removed by the comb filter. FIG. 12(c) shows the spectrum of the signal of the subcarrier frequency fsc converted by the balanced modulator 38a, the signal being mainly composed of a carrier chrominance signal with the central frequency fsc, including small amounts of upper and lower side bands. The signal shown in FIG. 12(c) can be used directly as the carrier chrominance signal. However, the signal of FIG. 12(c) may be passed through a bandpass.. filter having less sharp characteristics as shown in FIG. 12(d) to produce a resultant signal. Comparison of these spectrums with the conventional spectrum distribution of FIGS. 2(a)–2(c) clearly indicates that the spectrum distributions after the low-range-converted carrier chrominance signal has been converted into the carrier chrominance signal are much different from each other. Since no filter is necessary for removing unwanted spectrums or a filter of less sharp characteristics is only necessary for the removal of unwanted spectrums, the produced carrier chrominance signal is of good quality free from image degradation such as signal band distortion and group delay distortion.

In the embodiments of FIGS. 7 through 12, the low-range-converted carrier chrominance signal is converted into the base band signal which is then passed through the comb filter to remove unwanted side band components that are produced on demodulation. The comb filter may double as a comb filter required for removing crosstalk from adjacent tracks on VTRs such as VHS or Beta types for recording signals at azimuth high packing density. In the conventional arrangement of FIG. 1, the output signal from the balanced modulator 2 contains crosstalk from adjacent tracks in an interleaving relationship to a main signal. Therefore, after the low-range-converted carrier chrominance signal has been converted into the carrier chrominance signal, the crosstalk from the adjacent tracks is removed by a comb filter composed of a glass delay line. Where the present invention is applied to the azimuth high packing density recording, the output signals from the balanced modulators 26a, 26b of FIG. 7 and the output signal from the chrominance demodulator 30 of FIG. 11 contain crosstalk from adjacent tracks in an interleaving relationship to a main signal of the base band. Since the crosstalk is of the same spectrum as that of the side band components produced when the low-range-converted carrier chrominance signal is converted into the base band signal, the crosstalk can be simultaneously removed by the comb filters 27a, 27b. As these comb filters may be designed to process the base band signal only, they may be composed of a semiconductor delay circuit such as a CCD, and hence are more practical than attempts to widen the pass band of the prior art glass delay line.

Although the above embodiments have been described as being directed to the method of reproducing a chrominance signal of an NTSC television signal, the present invention is also effective in reproducing a chrominance signal of a PAL television signal. For recording a PAL television signal on a VTR, the carrier frequency fc of a low-range-converted chrominance signal is selected to be a multiple of $\frac{1}{4} f_H$ by an odd number as indicated by the following equation (5):

$$fc = \tfrac{1}{4} f_H (2n_1 - 1) \qquad (5)$$

Therefore, upper side bands 2fc−fa and 2fc+fa generated after the low-range-converted chrominance signal has been converted into the base band are expressed by:

$$2fc \pm fa = \tfrac{1}{4} f_H (n_2 - 1) \qquad (6)$$

The equation (6) indicates that the unwanted side band components are in ¼ line-offset relationship to the base band signal. These unwanted side band components can be removed by a comb filter including a delay circuit having a delay time of two horizontal periods. Therefore, the invention is applicable to the PAL system by replacing the 1-H comb filter for the NTSC system with a 2-H comb filter.

As described above in detail, when a low-range-converted carrier chrominance signal is to be converted into a chrominance signal in a base band or a prescribed carrier chrominance signal, unwanted side band components generated on demodulation into the base band are removed by base band comb filters. Since no low-pass filter or a bandpass filter having sharp cutoff characteristics is required; the band width of the chrominance signal can be kept wide, and any group delay distortion can be held to a minimum, so that images reproduced by the resultant chrominance signal are of high quality.

The arrangement of the invention is simple since it requires no bandpass filter (indicated at 4 in FIG. 1) for generating a conversion carrier to convert the low-range-converted chrominance signal into the carrier chrominance signal, but the carrier frequency can directly be used.

Inasmuch as the comb filter used may be of the base band as with the embodiment of FIG. 4, a digital delay circuit employing a CCD delay circuit or a memory device is suitable as the comb filter, and the comb filter is therefore smaller in size and more inexpensive than the glass delay line which has conventionally been used in the carrier band.

FIG. 13 is a block diagram of an arrangment of the invention in which sample-and-hold circuits are added to the embodiment of FIG. 7. A low-range-converted chrominance signal $C_L$ supplied from a terminal 1 is applied to balanced modulators 26a, 26b. Output signals from the balanced modulators 26a, 26b are fed through comb filters 27a, 27b to sample-and-hold circuits 42a, 42b, respectively, which convert the applied signals into base band chrominance signals e, f that are available from terminals 43, 44. The input terminal 28, the balanced modulators 26a, 26b, the comb filters 27a, 27b, the phase shifter 29, and the chrominance demodulator 30 composed of the balanced modulators 26a, 26b and the phase shifter 29 are of the same construction as those shown in FIG. 7, and will not be described.

FIGS. 14(a)-14(g) through 16 are diagrams explanatory of operation of the arrangement shown in FIG. 13. Let us assume that a base band color difference signal which is an orginal signal has a frequency fa. The low-range-converted chrominance signal $C_L$ is then composed of (fc−fa) and (fc+fa) components with a low-range conversion carrier frequency fc as a central frequency. The (fc±fa) components indicated by the broken line are indicative of crosstalk from adjacent tracks of the chrominance signal reproduced by a VTR, for example. In a long-play mode, the width of a playback head is wider than the recording tracks on the tape, and hence crosstalk is produced which has the level ranging from −6 to −10 dB with respect to the level of the chrominance signal on a main track. The spectrum of the crosstalk is in an interleaving relationship to the low-range-converted chrominance signal on the main track. Since the low-range-converted chrominance signal $C_L$ and the low-range conversion carrier fc are applied to the balanced modulator 26a, it produces an output signal composed of the sum of and the difference between the frequencies of the low-range-converted carrier chrominance signal $C_L$ and the low-range conversion carrier fc as shown in FIG. 14(b). (Since the balanced modulator 26b operates in the same manner as the balanced modulator 26a except that the phase of fc is 90° shifted, the balanced modulator 26b will not be described.) Therefore, the output signal from the balanced modulator 26a contains the frequency component fa of the base band color difference signal, (2fc−fa) and (2fc+fa) components which are upper side band components of fa with respect to the low-range carrier frequency fc, and fac, (2fc−fac), (2fc+fac) components generated by crosstalks. Where the base band chrominance signal fa is to be picked up to produce a B−Y component signal e, the output signal from the balanced modulator 26a would be passed through a low-pass filter having the characteristics of FIG. 14(c) and a base band comb filter. Since upper side band components of crosstalk remain as unwanted spectrums, however, the filters would be required to have shart cutoff characteristics, which would result in image degradation.

With the arrangement of FIG. 13, the above problem is avoided by passing the output signal from the balanced modulator 26a through a comb filter 27a and a sample-and-hold circuit 42a.

As described above with reference to the embodiment of FIG. 7, the low-range conversion carrier frequency to be recorded is selected substantially to be a multiple of $\frac{1}{4} f_H$ by an odd number. While the frequency component of the demodulated base band color difference signal e is expressed by the equation (2), crosstalk components from adjacent tracks can be expressed due to the interleaving relationship by:

$$fac = \frac{1}{4} f_H (2n_5 - 1) \tag{7}$$

$n_5$: integer

Figure 15:
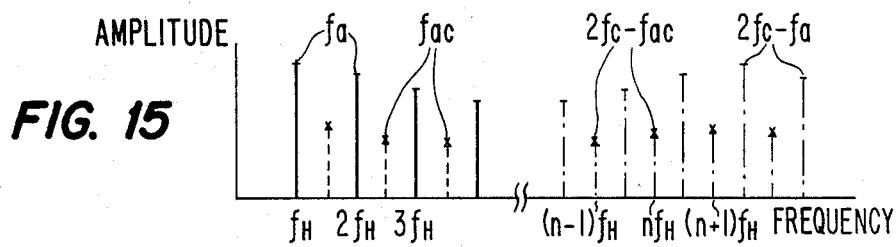
FIG. 15 is a diagram of a frequency spectrum explanatory of operation of a comb filter in the circuit arrangement of FIG. 13.

Therefore, the frequency components of the base band color difference signal are as indicated by fa and fac in FIG. 15. While the upper side band components 2fc±fa with respect to the low-range conversion carrier fc are expressed by the foregoing equations (3) and (4), upper side band components 2fc±fac due to crosstalks are in a frequency-interleaving relationship to the components 2fc±fa, and are expressed by:

$$2fc - fac = n_6 f_H \tag{8}$$

$$2fc + fac = n_7 f_H \tag{9}$$

Figure 16:
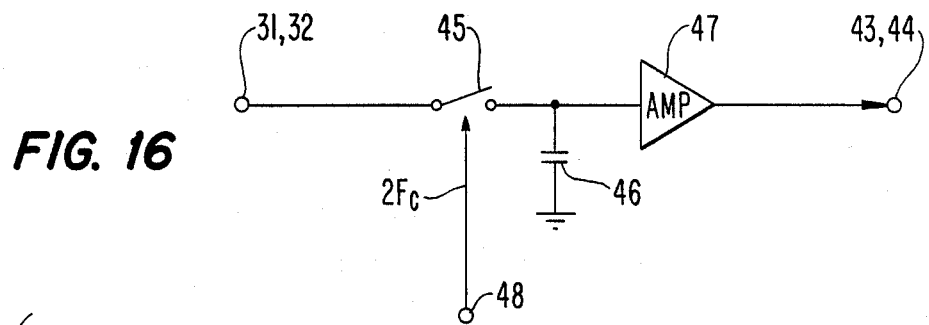
FIG. 16 is a diagram of the sample-and-hold circuit in FIG. 13.

$n_6$, $n_7$: integer These spectrums are indicated by 2fc−fa and 2fc−fac in FIG. 15. Although the component 2fc−fa is in an interleaving relation to the spectrum of fc, the component 2fc−fac is not in interleaving relation to the spectrum of fc, but is indicated by a spectrum which is a multiple of $f_H$. More specifically, the crosstalk component fc and the upper side band 2fc−fa are in an interleaving relationship to the base band chrominance signal fa of the output signal from the balanced modulator 26a. However, the upper side band component 2fc−fac of the crosstalk is not in an interleaving relationship to fc. By passing the output signal from the balanced modulator 26a through the comb filter 27a, the base band chrominance signal fa is issues as is, while the unwanted components 2fc−fa, 2fc+fa, and fac are largely attenuated since their spectrums are in the rejection band of the comb filter 27a. The remaining unwanted components 2fc±fac as indicated by the spectrums of FIG. 14(d) are contained in an output signal from the comb filter 27a. The output signal of the comb filter 27a is applied to the sample-and-hold circuit 11 which removes the unwanted components 2fc±fac. As illustrated in FIG. 16, the sample-and-hold circuit 42a, 42b is basically composed of a gate 45, a capacitor 46, and a buffer amplifier 47. The gate 45 is opened and closed by a clock signal 2Fc of a frequency 2fc applied from a terminal 48 for sampling and holding an input signal eo, fo from a terminal 31, 32 at the frequency 2fc. In general, a sample-and-hold circuit of a zeroth order for holding a signal has a frequency response having a zero point at a sampling frequency as shown in FIG. 14(e). Accordingly, the sample-and-hold circuit 42a is effective in attenuating the unwanted remaining components 2fc±fac which are side bands of crosstalk from adjacent tracks. Since the sample-and-hold circuit provides a maximum degree of attenuation at 2fc where the amplitude of the unwanted components is largest, the sample-and-hold circuit is highly effective to remove the unwanted components 2fc±fac. As a result, the unwanted components due to crosstalk can be attenuated without passing them through a low-pass filter, and the output signal from the sample-and-hold circuit 42a is of a spectrum as shown in FIG. 14(f), which is substantially free from any unwanted components. Since only fac remains in the output signal from the sample-and-hold circuit, it may be picked up through a low-pass filter having less sharp characteristics as shown in FIG. 14(g) or the B−Y component of the color difference signal may be picked up directly without the intervention of any low-pass filter. As described above, in obtaining the base band color difference signal, the demodulated base band chrominance signal is passed through the comb filter 27a and the sample-and-hold circuit 42a to remove unwanted components to a large degree, and any low-pass filter may be dispensed with or may be of less sharp characteristics. Therefore, chrominance signals having a side passband and small group delay distortion can be reproduced.

While the above description has been directed to the conversion of a low-range-converted chrominance signal into a B−Y component e of a color diffrnece signal, the low-range-converted chrominance signal can also be converted in exactly the same manner into an R−Y component f of the color difference signal by the balanced modulator 26b and the comb filter 27b.

An embodiment of the present invention in which no sample-and-hold circuits 42a, 42b are used for sampling and demodulating the low-range-converted chrominance signal $C_L$ will be described. Assuming that the conversion clock signal 4Fc of the A/D converter 16 in the embodiment of FIG. 4 has a frequency 4fc, the low-range-converted chrominance signal $C_L$ is sampled and converted into digital data by the A/D converter 16, and then separated into two sampled values of a frequency 2fc by the decoder 17. Where a circuit for holding digital data such as a digital latch is used as the separation means, it provides a data holding effect of zeroth order before the data is passed through the comb filter. Therefore, circuits corresponding to the sample-and-hold circuits 42a, 42b in FIG. 13 may be dispensed with.

Figure 2:
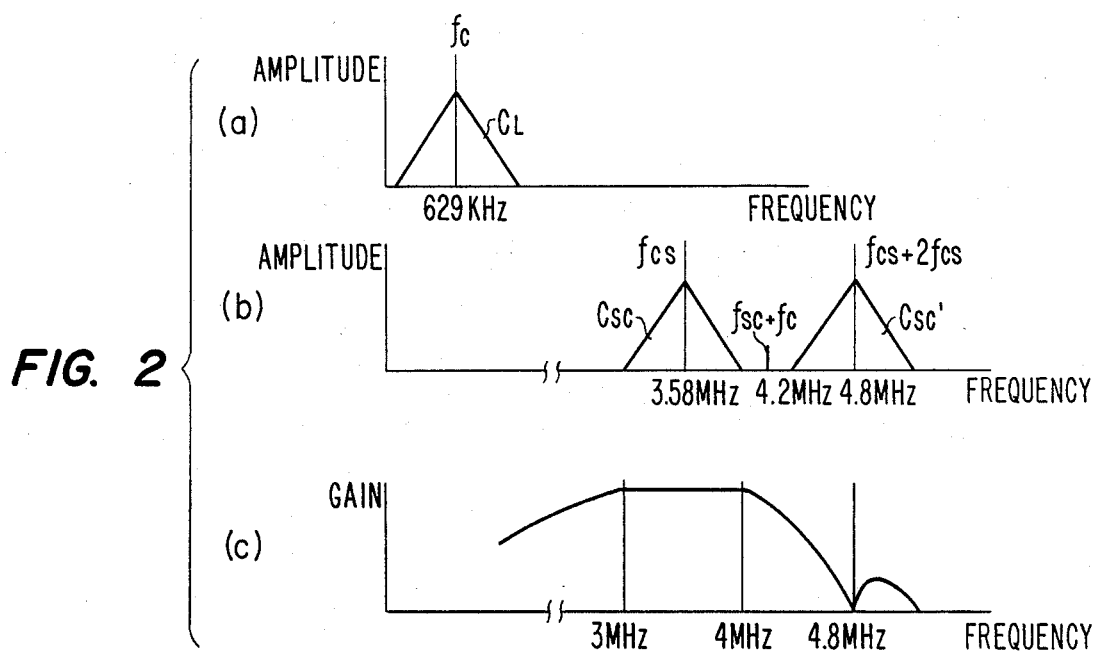
FIGS. 2(a)-2(c) are a set of diagrams showing frequency spectrums explanatory of frequency conversion in the arrangement of FIG. 1.
Figure 3:
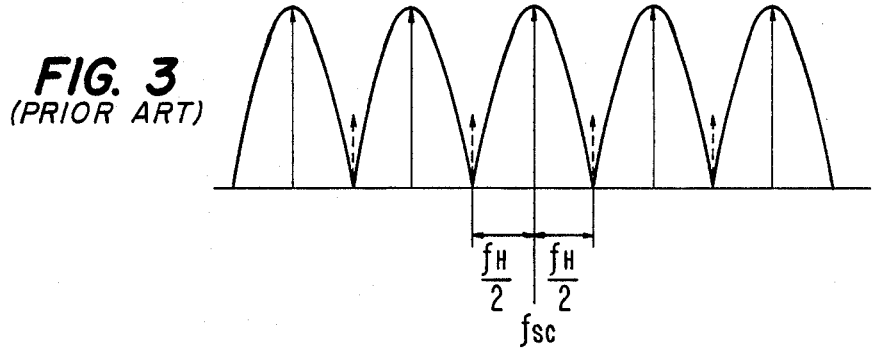
FIG. 3 is a diagram of a frequency spectrum illustrative of the characteristics of a comb filter in FIG. 1.
Figure 17:
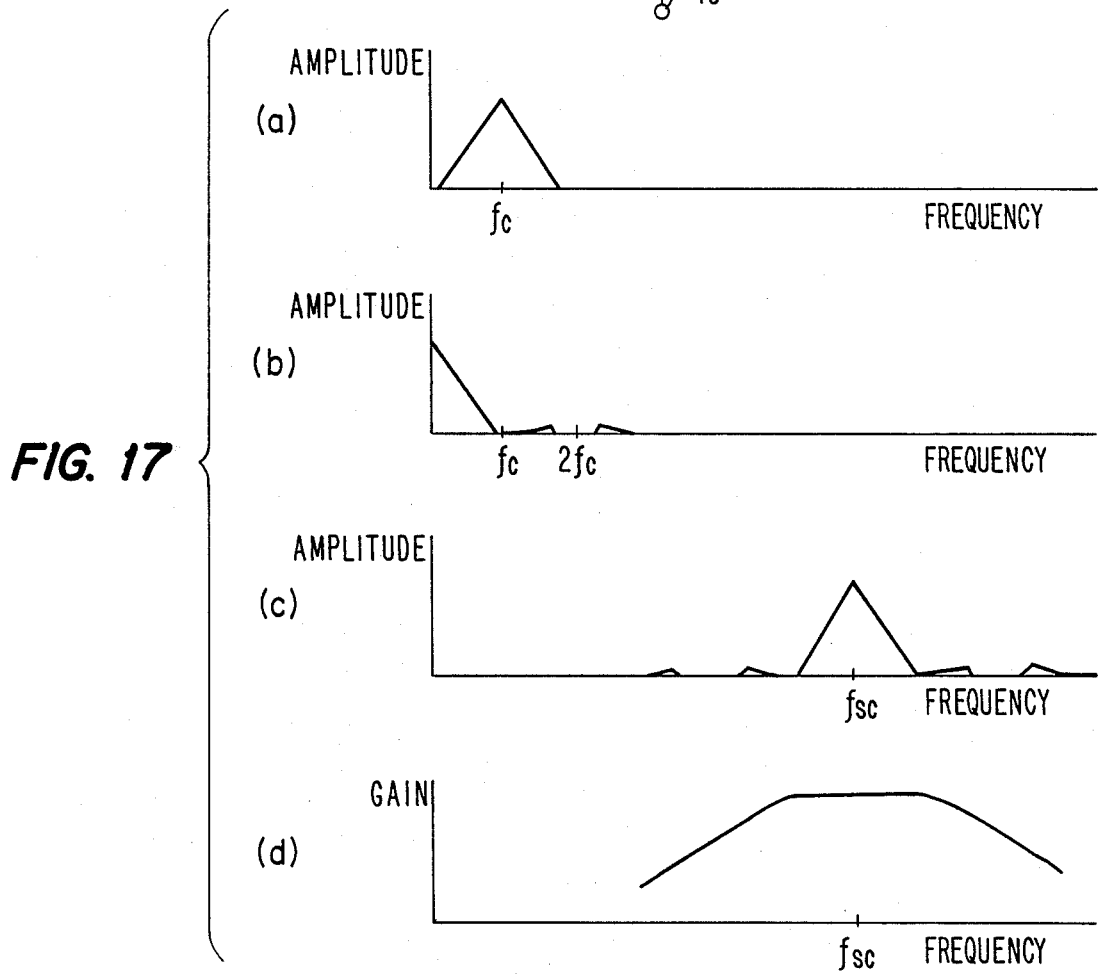
FIGS. 17(a)-17(d) are a set of diagrams of frequency spectrums explanatory of the operation of the circuit arrangements of FIGS. 4 and 13.

FIGS. 17(a)–17(e) spectrums-in which conversion into a carrier chrominance signal is expressed on an analog basis. FIG. 17(a) is the spectrum of an input low-range-converted chrominance signal $C_L$. FIG. 17(b) illustrates the spectrum of an output signal from the comb filter 18a or 18b of FIG. 4. The output signal contains a base band chrominance signal fa and unwanted side band components which could not be removed by the holding effect of the comb filter 18a or 18b. FIG. 17(c) shows the spectrum of a subcarrier frequency fsc converted by the encoder 19 of FIG. 4, the signal being mainly composed of the carrier chrominance signal having the central frequency fsc with small upper and lower side bands. The signal can be used directly as the carrier chrominance signal, or may be passed through a bandpass filter having less sharp cutoff characteristics as shown in FIG. 17(d). Comparison of these spectrums with the conventional spectrums of FIGS. 2(a)–2(c) shows that the spectrum distributions after the low-range-converted carrier chrominance signal has been converted into the carrier chrominance signal are much different from each other. Since no filter is necessary for removing unwanted spectrums or a filter of less sharp characteristics is only necessary for the removal of unwanted spectrums, the produced carrier chrominance signal is of good quality free from image degradation such as signal band distortion and group delay distortion.

In the embodiments of FIGS. 4 and 13, unwanted side band components generated on demodulating the low-range-converted chrominance signal are removed by passing the base band signal through the comb filters and the sample-and-hold circuits. The comb filter may double as a comb filter required for removing crosstalk from adjacent tracks on VTRs such as VHS or Beta types for recording signals at azimuth high packing density. In the conventional arrangement of FIG. 1, the output signal from the balanced modulator 2 contains crosstalk from adjacent tracks in an interleaving relationship to a main signal. Therefore, after the low-range-converted carrier chrominance signal has been converted into the carrier chrominance signal, the crosstalk from the adjacent tracks is removed by a comb filter composed of a glass delay line. With the present invention, the output signals from the balanced modulators 26a, 26b of FIG. 13 and the output signal from the decoder 17 of FIG. 4 contain color difference signal components of crosstalk from adjacent tracks in a frequency-interleaving relationship to a main color difference signal component from the main track in the base band. Since the crosstalk is of the same spectrum as that of the side band components produced when the low-range-converted carrier chrominance signal is converted into the base band signal, the crosstalk can be simultaneously removed by the comb filters 27a, 27b or 18a, 18b. As these comb filters 18a, 18b, 27a, 27b may be designed to process the base band chrominance signal only, they may be composed of a semiconductor delay circuit such as a CCD, and hence are more practical than attempts to widen the passband of the prior art glass delay line.

Although the above embodiments have been described as being directed to the method of reproducing a chrominance signal of an NTSC television signal, the present invention is also effective in reproducing a chrominance signal of a PAL television signal by replacing the 1-H comb filters with 2-H comb filters as is apparent from the description of the embodiment of FIG. 7.

With the present embodiment, when a low-range-converted carrier chrominance signal is to be converted into a chrominance signal in a base band or a prescribed carrier chrominance signal, unwanted side band components generated on demodulation into the base band are removed by base band comb filters and holding circuits. Since no low-pass filter or bandpass filter having sharp cutoff characteristics is required, the band-width of the chrominance signal can be kept wide, and any group delay distortion can be held to a minimum, so that images reproduced by the resultant chrominance signal are of a high quality.

The arrangement of the invention is simple since it requires no bandpass filter (indicated at 4 in FIG. 1) for generating a conversion carrier to convert the low-range-converted chrominance signal into the carrier chrominance signal, but the carrier frequency can directly be used.

Inasmuch as the comb filter used may be of the base band as with the embodiment of FIG. 7, a digital delay circuit employing a CCD delay circuit or a memory device is suitable as the comb filter, and the comb filter is therefore smaller in size and more inexpensive than the glass delay line which has conventionally been used in the carrier band.

In FIG. 4, the sampling clock signal 4Fc of the A/D converter 14 is used directly or frequency-divided as the operation clock signal for the comb filters 18a, 18b.

For sampling modulation, the clock signal 4Fc is required to have a frequency 4fc which is four times the low-range conversion carrier frequency fc of the low-range-converted chrominance signal $C_L$ so that the clock signal 4Fc will follow the jitter of the signal. Where a digital memory and a digital shift register are used in the delay circuit which one component of the comb filter, and the clock signal 4Fc or its frequency-divided clock signal is used as an operation clock signal for the digital memory and digital shift register, the delay of the delayed data follows jitter of the signal $C_L$, thus preventing the comb filter from being rendered less effective by jitter, unlike a comb filter in which the delay time is fixed. In addition, the demodulating decoder and the comb filter can easily be interfaced, and the PLL circuit 24 or the like for producing the A/D conversion clock signal in FIG. 4 may be double as a clock generator for generating the clock signal to operate the digital memory or the digital shift register. Instead of using the A/D converter 16, the low-range-converted chrominance signal $C_L$ may be sampled by an analog sample-and-hold circuit, and sampled data may be inverted by an inverting amplifier for sampling demodulation. Alternatively, the operation clock signal (from the clock generator 35 in FIG. 9) for the analog comb filter 27a in FIGS. 7, 11, 13 may be used as a demodulation clock signal or a clock signal generated by the carrier or frequency-divided.

Figure 14:
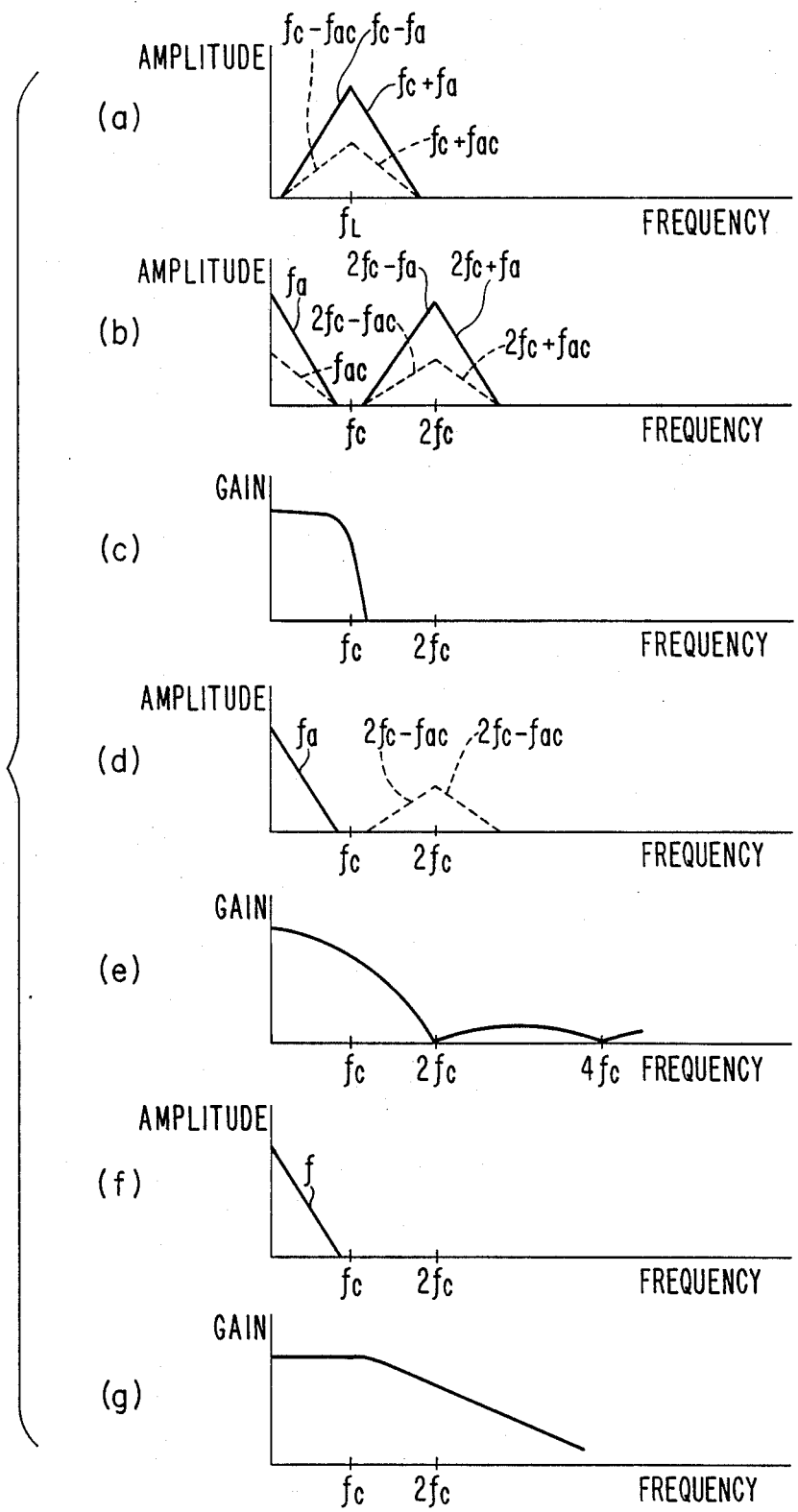
FIGS. 14(a)-14(g) are a set of diagrams of frequency spectrums illustrative of the operation of the circuit arrangement of FIG. 13.
Figure 18:
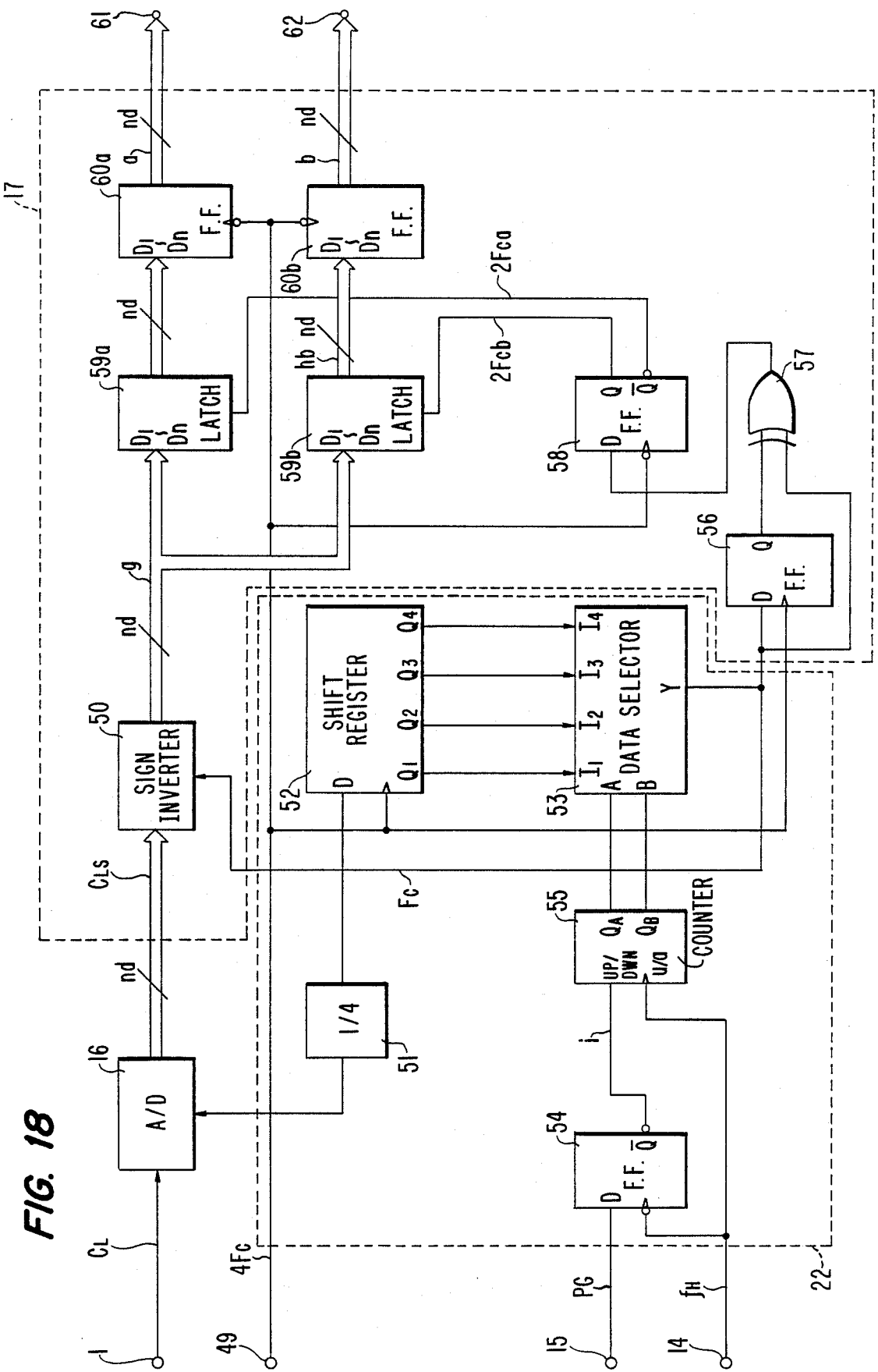
FIG. 18 is a logic circuit diagram of a few blocks for effecting sampling demodulation in the circuit arrangement of FIG. 4.
Figure 19:
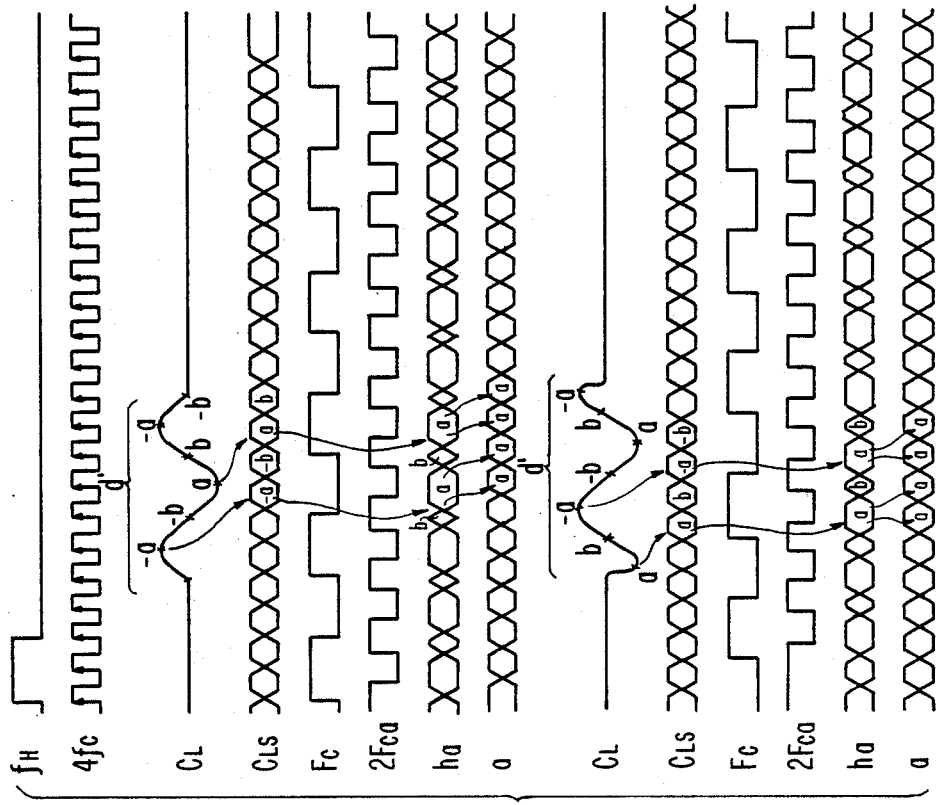
FIG. 19 is a timing diagram showing signal waveforms in the arrangement of FIG. 18.

FIG. 18 is a logic circuit diagram of an arrangement in which the A/D converter 16, the decoder 17, and the signal producing circuit 22 in FIG. 14 are combined as a logic circuit, and FIG. 19 is a timing diagram showing signals generated in the arrangement of FIG. 18.

As shown in FIG. 18, the arrangement includes a terminal 1 to which a low-range-converted chrominance signal $C_L$ is applied, a terminal 49 to which a first clock signal 4Fc having a frequency 4fc is applied, a terminal 14 to which a horizontal synchronizing signal $f_H$ is applied, and a terminal 15 to which a track discriminating signal PG is applied. The low-range-converted chrominance signal $C_L$ supplied through the terminal 1 is converted by an A/D converter 16 into a digital signal at the timing of the clock signal 4Fc. The low-range-converted chrominance signal $C_L$ has a B−Y component a and an R−Y component b which are 90° out of phase with each other as shown in FIG. 5. The clock signal 4Fc supplied to the terminal 49 is produced, as with the embodiment of FIG. 4, by the PLL circuit 24 from the burst d' of the low-range-converted chrominance signal which is extracted by the burst gate 23. Under normal condition, the clock signal comprises data in which the output signal $C_{LS}$ of the A/D converter 16 is a repetition of a, b, −a, −b at the timing of FIG. 19. The converted data $C_{LS}$ is applied to a sign inverting circuit 50 in which only the data items −a and −b of the data $C_{LS}$ are inverted by sign inverting pulses Fc to produce data g which is a repetition of a and b. The pulses Fc are produced by causing a shift register 51 to shift a signal generated by frequency-dividing 4Fc by ¼ with 4Fc as one clock pulse to thereby generate four-phase pulses, and switching these four-phase pulses in each horizontal period with a data selector 53. Switching signals A, B for switching the output data from the data selector 53 are generated by passing the track discriminating signal PG through a flip-flop 54 with negative-going edges of the horizontal synchronizing signal $f_H$ to produce a signal i, and switching the up/down counting operation of an up/down counter 55 that counts $f_H$ with the signal i for producing output signals $Q_A$, $Q_B$ which serve as the switching signals A, B. With the above circuit arrangement, the pulses Fc are advanced 90° in phase in each horizontal period when the signal PG is a high digital signal level, and delayed 90° in each horizontal period when the signal PG is low, so as to thereby effect a phase shift identical to that of the low-range conversion carrier. Therefore, sign inversion is effected along a sampling demodulation axis. The clock signal Fc and a signal produced by shifting the clock signal Fc by 90° with a flip-flop 56 are exclusive-ORed by a gate 57, and a flip-flop 58 reads an output signal from the gate 57 at negative-going edges of 4Fc to produce clock pulses 2Fca, 2Fcb for separating the color difference signals. The data, after having passed through the sign inverting circuit 50, is latched by latches 59a, 59b in response to the clock signals 2Fca, 2Fcb to produce data ha, hb. The data ha includes data on B−Y and R−Y components of the color difference signals. As indicated at ha in FIG. 19, since there are main data items a and other color difference signal data items b, the data is further sampled by a flip-flop 60a to issue color difference signal data a that can be used through a terminal 61. Although FIG. 19 shows the timing to pick up the color difference signal data a, the color difference signal data b can be issues to a terminal 62 by passing data hb latched by 2Fcb which is 180° out of phase with 2Fca through a flip-flop 60b.

FIG. 19 shows a timing (first H) in the period of a low-range-converted burst and a timing (second H) in the period of a burst in a next horizontal period in the circuit arrangement of FIG. 18. The low-range conversion carrier frequency fc for the low-range-converted chrominance signal $C_L$ is determined as a multiple of ½ of the horizontal synchronizing frequency $f_H$, and the low-range-converted chrominance signal $C_L$ is shifted 90° in phase by the PS process, and the phase of the low-rangeconverted burst d' is also shifted. Since the two color difference signal data a, b are obtained at a sampling frequency 2fc which is twice the low-range conversion carrier frequency fc, sampling points are shifted 180° in phase from each other in first and second Hs with respect to one color difference signal data if the horizontal synchronizing signal $f_H$ is used as a reference, resulting in discontinuous data. To avoid this problem, a zeroth-order holding filter is used to interpolate the data of the preceding sampling points to form data between the sampling points for thereby producing continuous color difference signal data and equalizing output timings in one horizontal period, so that the subsequent process can easily be effected.

The frequency divider 51, the shift register 52, the data selector 53, the flip-flop 54, and the up/down counter 55 in FIG. 18 jointly constitute the signal generating circuit 2 of FIG. 4, and the sign inverting circuit 50, the flip-flops 56, 58, 60a, 60b, the gate 57, and the latches 59a, 59b jointly constitute the decoder 17 of FIG. 4.

In the above embodiment the low-range-converted chrominance signal $C_L$ subjected to the PS process is separated into the two color difference signal data a, b. For processing a low-range-converted chrominance signal CL subjected to the PI process, the shift register 52 of FIG. 18 is replaced with an inverter 63 (FIG. 20) for generating pulses having a frequency which is ¼ of that of the clock signal 4Fc and inverted pulses, the up/down counter 55 is replaced with a frequency divider composed of a flip-flop 64, and an AND gate 65 is added for prohibiting the horizontal synchronizing signal $f_H$ applied to a clock input of the flip-flop 64 which generates a frequency-divided signal of the horizontal synchronizing signal $f_H$ when an output signal i of the flip-flop 54 is a low digital signal level. Dependent on the track discriminating signal PG, the sign inverting pulses Fc are inverted in each H or successively issued, so that the same color difference signal data a, b as those in the PS process can be obtained. Designated at 66 is a data selector. In the PI process, the low-range conversion carrier frequency is seelcted to be a multiple by an odd number of ¼ of the horizontal synchronizing frequency $f_H$. As with the PS process, sampling points are shifted 180° in phase from each other in the first and second Hs if the horizontal synchronizing signal $f_H$ is used as a reference, making the sampling points discontinuous. Therefore, to avoid this problem, data between the sampling points is interpolated by a zeroth-order filter to produce the color difference signal data having a sampling frequency fs which is four times fc and continuous and which is a multiple of $f_H$. The foregoing description is directed to the low-range-converted chrominance signal having 1-H correlation as in the case where signals are recorded and reproduced in the PS and PI processes for a carrier chrominance signal of the NTSC system. Where the low-range-converted chrominance signal has 2-H correlation as in the PAL system, the sampling frequency of each color difference signal data after data between the sampling points has been interpolated is four times the low-range conversion carrier frequency and a multiple of fH/2 by an odd number, so that output timings for data in every 2 Hs are equalized.

Figure 20:
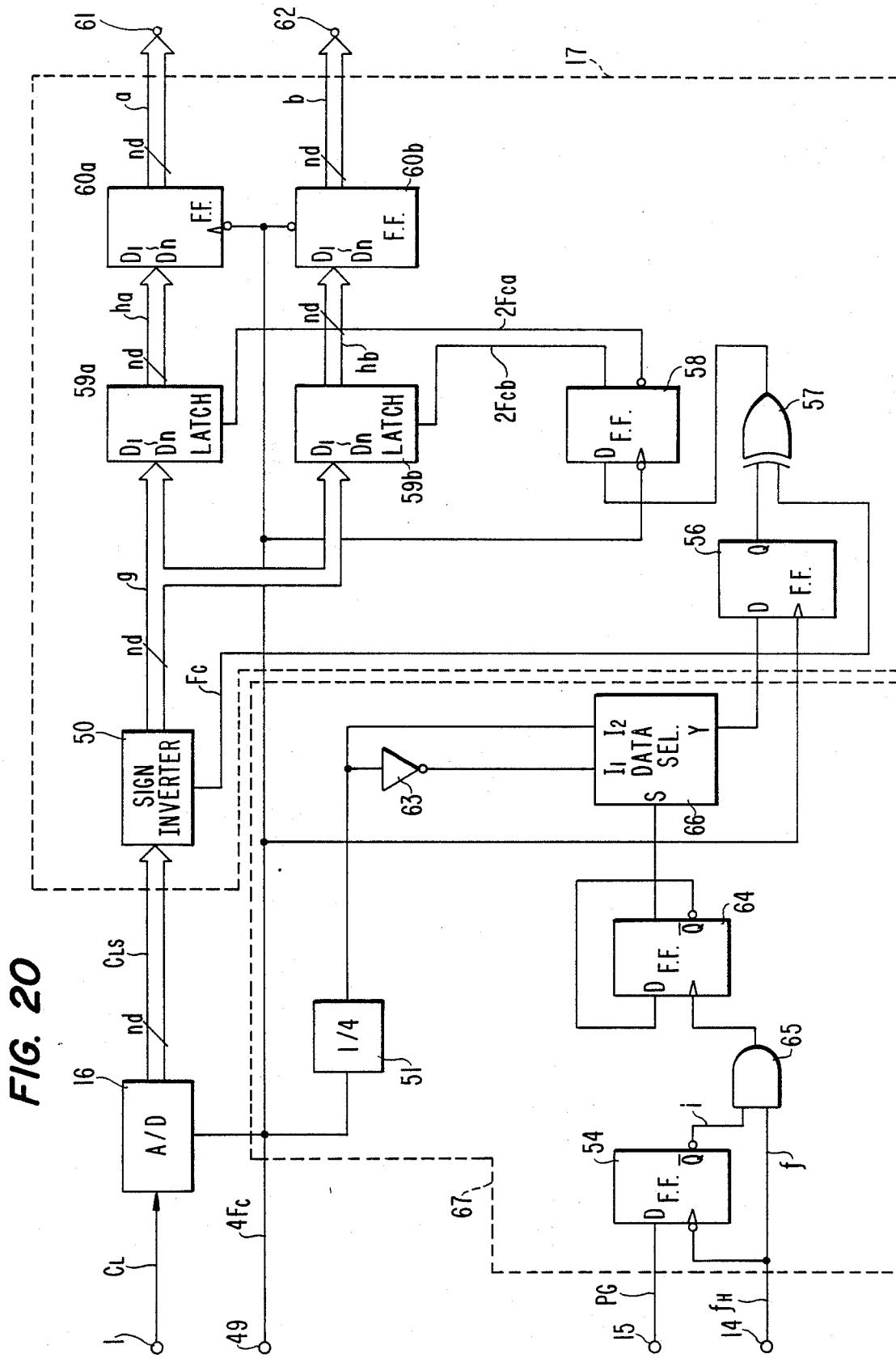
FIG. 20 is a logic circuit diagram of an arrangement similar to that of FIG. 18, but modified for processing a low-range-converted chrominance signal that has been subjected to a PI process.

With the logic circuits shown in FIGS. 18 and 20, it is possible to sample and demodulate the low-range-converted chrominance signal subjected to the PS or PI process into color difference signal digital data having a continuous sampling frequency with the sampling means comprising the A/D converter 16 and the digital circuit of simple arrangement.

The frequency divider 51, the flip-flops 54, 64, the inverter 63, the gate 65, the data selector 66 in the logic circuit of FIG. 20 for processing the low-range-converted chrominance signal which has been subjected to the PI process jointly constitute a circuit corresponding to the signal generating circuit 22 of FIG. 4 or the block 22 of the logic circuit of FIG. 18 for processing the low-range-converted chrominance signal subjected to the PS process. Comparison of FIGS. 18 and 20 shows that the A/D converter 16 and the circuit corresponding to the decoder 17 of FIG. 4 may remain of the identical circuit arrangements. This is because, by producing color difference signal data separation pulses from the sign inverting pulses Fc having the frequency fc equal to that of the low-range conversion carrier and subjected to the same PS or PI process, and the first clock signal 4Fc (having the frequency 4fc which is four times the frequency fc in FIGS. 18 and 20), the operation of the circuit corresponding to the decoder 17 of FIG. 4 can all be controlled by the timing produced by the pulses 4Fc and Fc. The signal producing circuits 22, 67 in FIGS. 18 and 20 also include arrangements which can be constructed of the same circuit.

Utilizing the circuit portion which is common in the logic circuits of FIGS. 18 and 20, two circuits for producing sign inversion pulses Fc may be provided for the PS and PI processes, respectively, and may be selected by an external switching signal to provide a chrominance signal reproducing method capable of effecting both the PS and PI processes.

Figure 21:
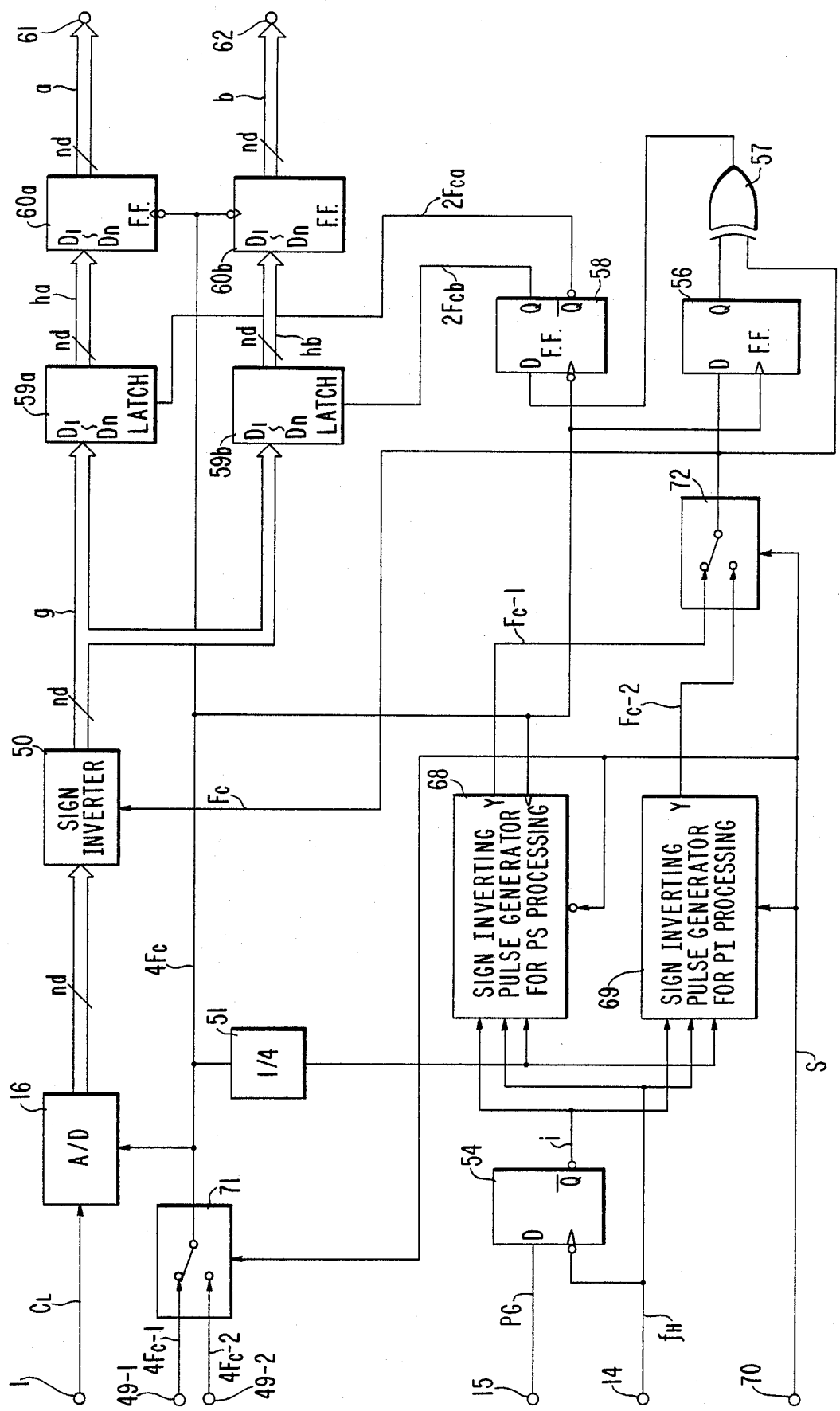
FIG. 21 is a logic circuit diagram of an arrangement in which the arrangements of FIGS. 18 and 20 are combined to process low-range-converted chrominance signals which have been subjected to PS and PI processes.

FIG. 21 is a circuit diagram of a chrominance signal processing device for carrying out the both PS and PI processes. The device includes a sign inverting pulse generator circuit 68 for the PS process, the circuit 68 including the shift register 52, the up/down counter 55, and the data selector 53 shown in FIG. 18, and a sign inverting pulse producing circuit 69 for the PI process, the circuit 69 including the flip-flop 64, the AND gate 65, the inverter 63, and the data selector 66 in FIG. 20. In the embodiment of FIG. 21, the sign inverting pulse generator circuit arrangement includes the sign inverting pulse generator circuit 68 for the PS process and the sign inverting pulse generator circuit 69 for the PI process, and also a procss switching signal input terminal 70 and signal switching circuits 71, 72. In response to a process switching signal s supplied from the terminal 70, the sign inverting pulses Fc can be changed by the signal switching circuit 72 to either sign inverting pulses Fc-1 for the PS process or sign inverting pulses Fc-2 for the PI process. The process switching signal s is also supplied to the sign inverting pulse generator circuits 68, 69 to de-energize one of the circuits 68, 69 to prevent an increase in the power consumption. Since different low-range carrier frequencies are used for the PS and PI processes, respectively, the clock signal 4Fc of the frequency which is four times the low-range carrier frequency is switched by the signal switching circuit. For example, a clock signal 4Fc-1 having a frequency which is four times the low-range carrier frequency for the PS process is supplied from an input terminal 49-1, and a clock signal 4Fc-2 having a frequency which is four times the low-range carrier frequency for the PI process is supplied from an input terminal 49-2. The other circuit portions of FIG. 21 may be identical to those of FIGS. 18 and 20.

In the arrangement of FIG. 21, the two PS and PI processes are switched over. However, a switching signal input terminal and a clock input terminal may be added, and a sign inverting pulse generator circuit may be added for effecting another recording and reproducing process. The chrominance signal processing device with such an arrangement can process signals supplied in two or more difference recording and reproducing processes or systems.

According to the logic circuits of the embodiments shown in FIGS. 18 through 21, where the low-range-converted chrominance signal subjected to the PS or PI process is to be demodulated by the A/D converter into the two color difference signals with a clock signal having a frequency which is four times the low-range conversion carrier frequency, color difference signal separation pulses for separating converted digital data after being inverted in sign are produced from sign inverting pulses along a demodulation axis. Therefore, the low-range-converted chrominance signal can be demodulated into the two color difference signal data with a simple digital circuit, and the PS and PI processes can be carried out by a single circuit arrangement by adding simple circuits.

A chrominace signal reproducing method according to another embodiment of the present invention will be described below.

Figure 22:
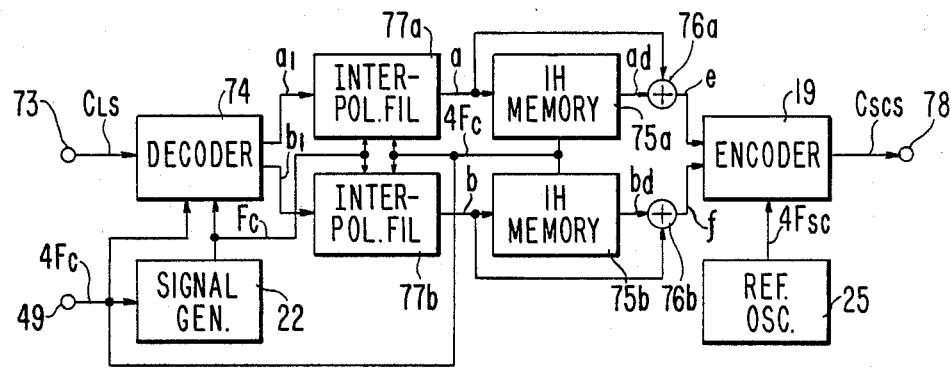
FIG. 22 is a detailed block diagram of a portion of the arrangement of FIG. 4.
Figure 23:
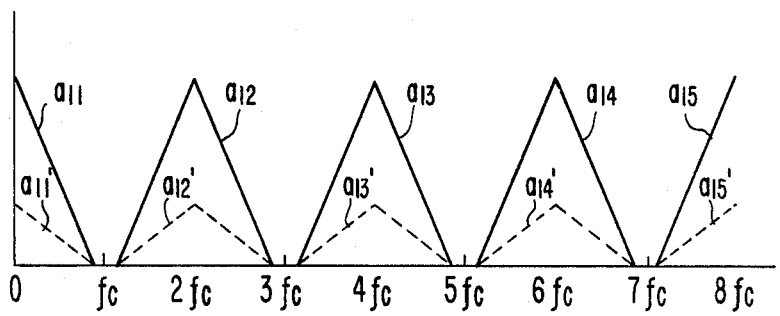
FIG. 23 is a diagram of a frequency spectrum of an output signal from a decoder in the arrangement of FIG. 22.
Figure 24:
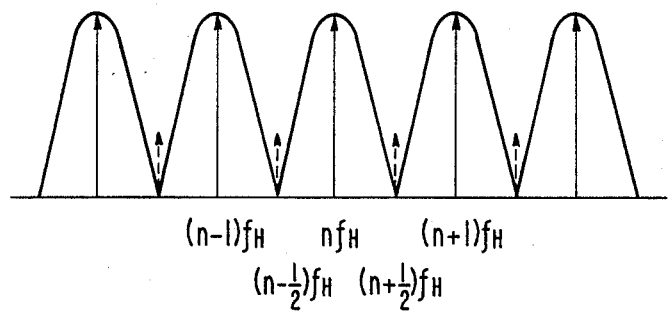
FIG. 24 is a diagram showing on an enlarged scale a frequency spectrum of odd-numbered harmonics in the spectrum of FIG. 23.
Figure 25:
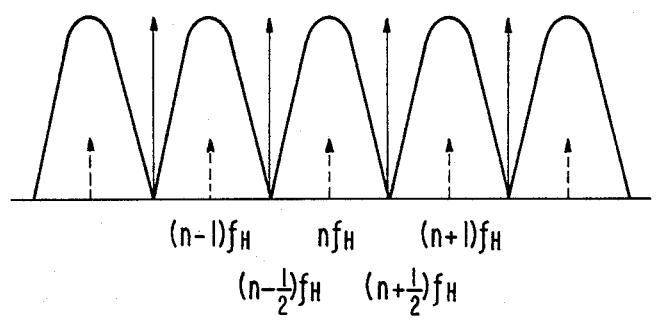
FIG. 25 is a diagram showing on an enlarged scale a frequency spectrum of even-numbered harmonics in the spectrum of FIG. 23.

FIG. 22 is a block diagram showing in greater detail a portion of the circuit arrangement of FIG. 4. In FIG. 22, a terminal 73 is supplied with a low-range-converted chrominance signal $C_{LS}$ as converted by the A/D converter 16 into digital data. A decoder 74 is different from the decoder in FIGS. 4, 18 or 20 in that it has no holding circuit of zeroth order, but only functions to separate digital data $C_{LS}$. The sampling frequency for the digital data $C_{LS}$ of the low-range-converted chrominance signal is fs=4fc. Sign inverting pusles Fc which are of the same frequency and phase as those of the low-range conversion carrier are produced from the first clock 4Fc for A/D conversion supplied from a terminal 49. A decoder 74 serves to invert the positive and negative signs of the digital data $C_{LS}$ in which the sampling frequency fs=4fc with the sign inverting pulses Fc along the demodulation axis to produce data a1, b1 corresponding to B−Y and R−Y components of the color difference signal in each horizontal period. Since the sampling frequency for the data $C_{LS}$ is fs=4fc, the data a1, b1 issued alternately by the decoder 74 constitute digital data having a sampling frequency 2fc. The dititalal data has a frequency spectrum as shown in FIG. 23 on an analog signal basis. The illustrated frequency spectrum includes a demodulated original color difference signal spectrum $a_{11}$, a crosstalk component $a_{11}$, from adjacent tracks which is introduced upon signal reproduction on a VTR or the like, harmonics $a_{12}, a_{13}, a_{14}, \ldots$ of the original color difference signal which have upper and lower side bands having central frequencies which are multiples of the sampling frequency 2fc, and harmonics $a_{12}', a_{13}', \ldots$ of the crosstalk component. The frequency interleaving relationship given between the main signal and the crosstalk component by the PI or PS process remains unlost even after having passed through the sampling demodulation system. As shown in FIG. 24, odd-numbered harmonics including the fundamental $a_{11}$ of the demodulated color difference signal data contain spectrums of the original color difference signal component indicated by the solid-line arrows with a central frequency $nf_H$ (n is a positive integer including 0) and spectrums of crosstalk components from adjacent tracks indicated by the dotted-line arrows having a central frequency $(n+\frac{1}{2})f_H$. As shown in FIG. 25, even-numbered harmonics contain spectrums of the original color difference signal component having a central frequency $(n+\frac{1}{2})f_H$ and spectrums of crosstalk components from adjacent tracks having a central frequency $nf_H$. The crosstalk components can be removed from the odd-numbered harmonics including the fundamental of the color difference signal data by a comb filter which adds the data to data delayed by 1 H and which has a characteristic curve as shown in FIG. 24. The harmonics of the original color difference signal component are removed from the even-numbered harmonics by a comb filter having a characteristic curve of FIG. 25, leaving only the harmonics of the crosstalk components. The above operation of the comb filters is achieved by a circuit composed of 1-H memories 75a, 75b and adders 76a, 76b in FIG. 22. The circuitry composed of the memory 75a and the adder 76a corresponds to the comb filter 18a in FIG. 4, while the circuitry of the memory 75b and the adder 76b corresponds to the comb filter 18b. Interpolation filters 77a, 77b will be described later on. Since the sampling frequency for the color difference signal data a1, b1 having passed through the decoder 74 is 2fc and the frequency fc is a multiple of $\frac{1}{4} f_H$ by an odd number: $fc = \frac{1}{4}(2n-1)f_H$, a sampling period Ts of the sampling frequency 2fc for the data a1, a2 is:

$$Ts = 1/2fc \quad (10)$$
$$= 1/(2n-1)f_H$$
$$= 2H/(2n-1)$$

n: integer
H: horizontal period
From the equation (10), $$H = (2n-1)/2 \, Ts \quad (11)$$

If the data of the sampling frequency fc were delayed simply by the clock signal of the period Ts, only a delay which is a multiple of Ts would be obtained, and a fraction of $\frac{1}{2}$ Ts would result with respect to one horizontal period. To solve this drawback, the interpolation filters 77a, 77b insert interpolated data between the data items of the sampling frequency 2fc on a time basis for converting the data into data having a sampling frequency 4fc. Since the encoder 17 shown in FIGS. 4, 18, 20 are supplied with data one sampling clock pulse prior to the data, the interpolation filters 77a, 77b are not required in FIGS. 4, 18, 20. In the embodiment of FIG. 22, the circuitry of the decoder 74 and the interpolation filters 77a, 77b corresponds to the decoder 17 shown in FIGS. 4, 18, 20.

Figure 27:
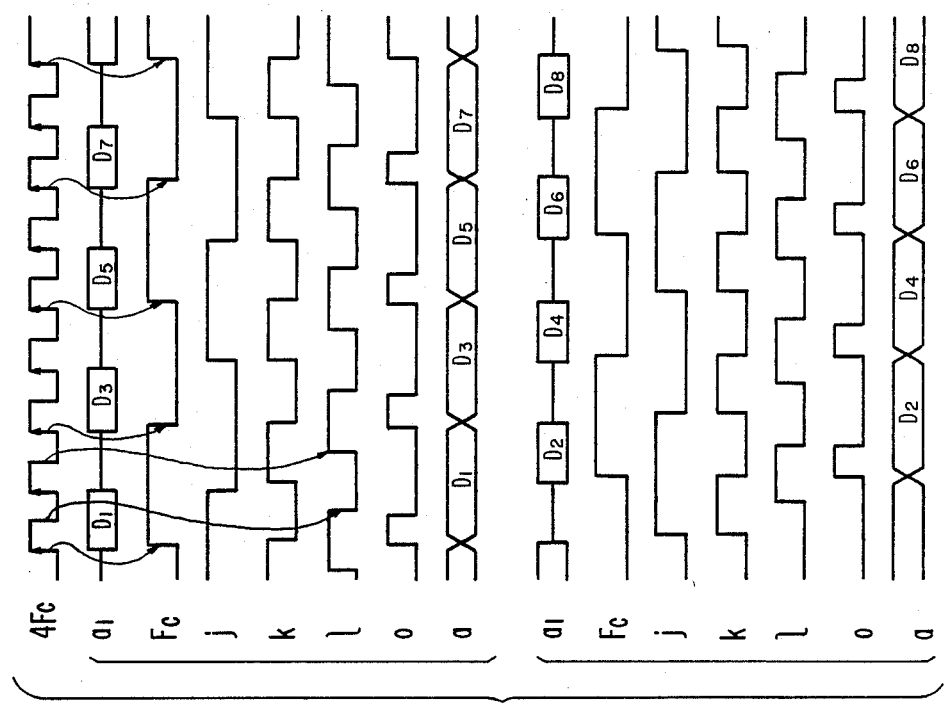
FIG. 27 is a timing diagram of signal waveforms generated in the arrangement of FIG. 26.
Figure 26:
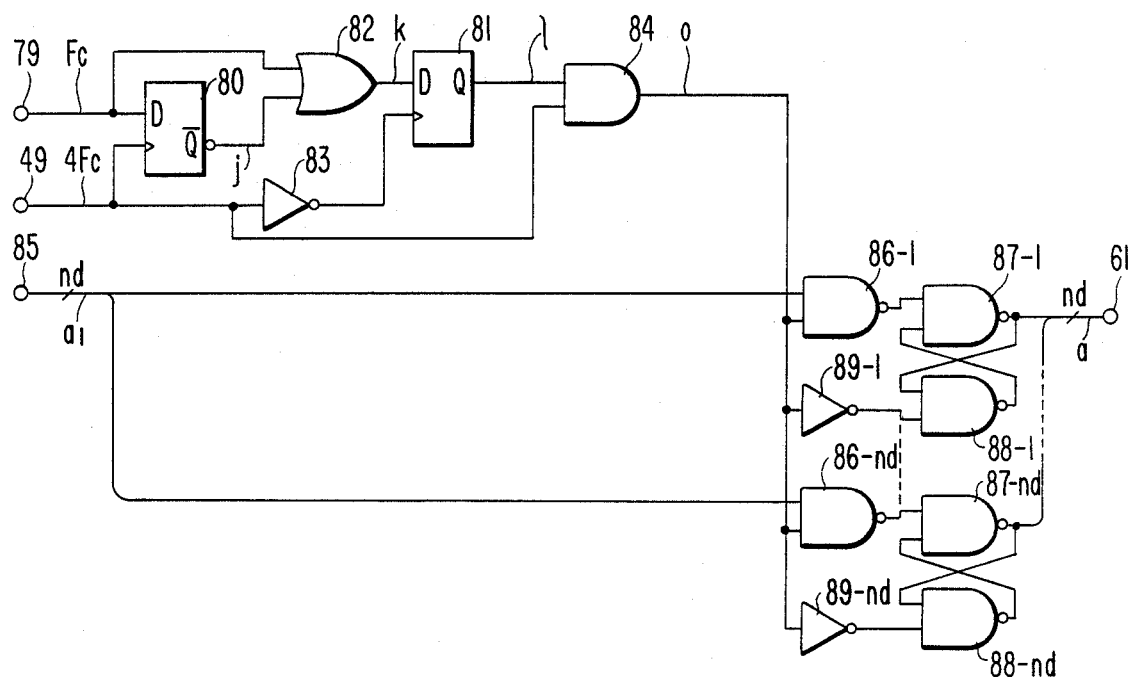
FIG. 26 is a block diagram of an interpolation filter in the arrangement of FIG. 22.
Figure 28:
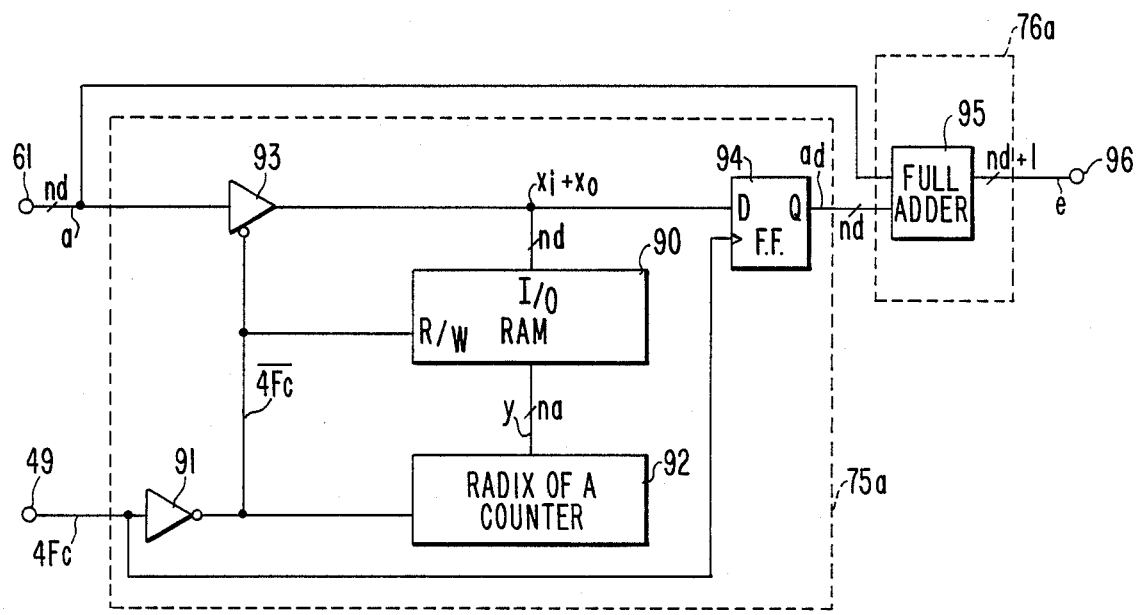
FIG. 28 is a block diagram of a 1-H memory and an adder in the arrangement of FIG. 22.
Figure 29:
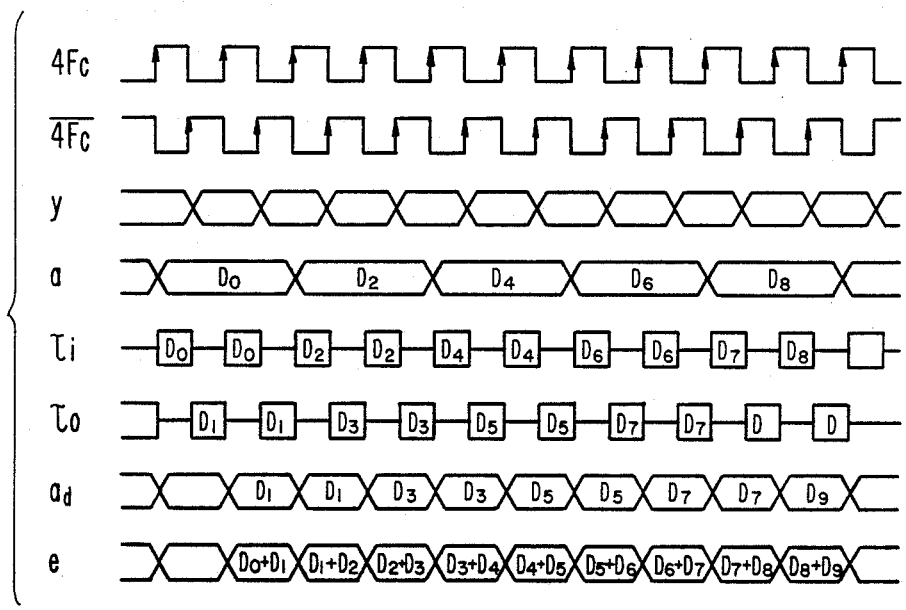
FIG. 29 is a timing diagram of signal waveforms generated in the arrangement of FIG. 28.

In FIG. 22, the circuiry composed of the interpolation filter 77a, the memory 75a, and the adder 76a serves to convert the data a1 into usable color difference signal data e, and the circuitry composed of the interpolation filter 77b, the memory 75b, and the adder 76b serves to convert the data b1 into usable color difference signal data f. Since these circuitries operate in substantially the same manner, only the circuitry for convering the data a1 into the data 3 will be described. FIG. 26 is a detailed circuit diagram of the interpolation filter 77a, FIG. 27 is illustrative of the timing of signal waveforms in the arrangement of FIG. 26, FIG. 28 shows a detailed circuit of the 1-H memory 75a and the adder 76a, and FIG. 29 illustrates the timing of signal waveforms in the arrangement of FIG. 28. Operation of the interpolation filter will be described in greater detail with reference to FIGS. 26 and 27. The data a1 from the decoder 74 in the first H is shifted in output timing by one clock pulse of the first clock 4Fc with respect to the data a1 in the second H, as shown in FIG. 27. An interpolation filter would simply insert a digital data 0 into a portion free of data, or another interpolation filter would insert a digital data 0 which would then be passed through a low-pass digital filter. The interpolation filter shown in FIG. 26 comprises a zeroth-order holding filter for inserting data one clock pulse before into a portion free of data.

In FIG. 26, pulses (indicated by o in FIG. 27) which go high in a front half of each clock pulse in which the data a1 is issued are produced by a circuitry composed of flip-flops 80, 81 and gates 81, 83, 84 from sign inverting pulses Fc supplied from a terminal 79 and a clock signal 4Fc supplied from a terminal 49. Then, 1-bit data of the color difference signal data a1 supplied from a terminal 85 is introduced at the high levels of the pulses o by a latch composed of gates 86-1 through 89-1, and the signal thus introduced is held by the latch at the low levels of the pulse o and issued as a signal a to a terminal 61. Where the data a1 from the terminal 85 is of nd bits, nd latches each compose of the gates 86-1 through 89-1 are required. The circuit arrangement for each bit remains the same as indicated by gates 86-nd through 86-nd. In FIG. 27, the timings of Fc and j in the first and second Hs are different dependent on the selected value of the low-range carrier frequency and the direction of rotation, but the timings differ only in that the timings in the second H are shifted to the right or left by one clock pulse with respect to the fist H. The timings of the other signals 4Fc, a1, k, o, a remain the same. Where the color difference signal b1 is to be processed, the timing relationship between Fc and o should be shifted one clock pulse. This can be achieved by changing the gate 82 from an exclusive-OR gate in FIG. 26 to an exclusive-NOR gate.

The color difference signal data having passed through the interpolation filter 77a is passed through the circuitry of the the 1-H memory 75a and the adder 76a, thereby achieving the operation of the comb filter as described above. In the illustrated arrangement of FIG. 28, the 1-H memory comprises a random-access memory (RAM) 90 having an address number A=fs/$f_H$. A modulo-A counter 92 is actuated by a clock $\overline{4Fc}$ which is produced by inverting a clock signal 4Fc from a terminal 49 with a gate 1, thereby generating a memory address y for the RAM 90. The clock signal $\overline{4Fc}$ is also supplied to a control signal input terminal of a three-valued buffer 93 for controlling an input xi which feeds the color difference signal data from a terminal 61 to an I/O port of the RAM 90. The clock signal $\overline{4Fc}$ is also supplied to a read/write control input terminal (R/W) of the RAM 90 for controlling the reading and writing of the data. As shown in FIG. 29, the memory address y is determined a half clock pulse prior to the clock signal 4Fc, and simultaneously a data is read out of the RAM 90, and written into the RAM 90 in front half periods of the clock signals 4Fc. Therefore, data xo is read from the RAM 90 such that data 1 H prior to input data a is read out a half clock pulse earlier. The data xo is latched by a flip-flop 94 at the timing of the clock signal 4Fc to produce data $a_d$ 1 H earlier. With the above memory arrangement, the adder 76a can be constructed of a full adder 95 for receiving input data of nd bits+nd bits and issuing an output signal e of (nd+1) bits. The data e is issued from a terminal 96 at a timing e illustrated in FIG. 19.

The color difference siganl data e, f from which the crosstalk components have been removed by the interpolation filters 77a, 77b, the 1-H memories 75a, 75b, and the adders 76a, 76b are converted by the encoder 19 in FIG. 22 into digital data $C_{SCS}$ of the carrier chrominance signal having the reference frequency fsc, which is issued from a terminal 78. As illustrated in FIG. 22, the encoder 19 produces the data $C_{SCS}$ from the data e, f based on the clock signal 4Fsc having the frequency 4fsc which is four times that of fsc and generated by the reference oscillator 25. The encoder 19 of FIG. 22 operates in the same manner as the encoder of FIG. 4. Where the color difference signal data ef is subjected by the encoder 19 to digital quadrature two-phase balanced modulation, the frequency spectrums of the color difference signal data e, f as they are regarded as analog signals should preferably fall within the band (0<- fe<fc, where fe is the frequency of the color difference signals) for the reasons of preventing signals from being generated outside of the band of the carrier chrominance signal, and of preventing noise from being produced within the band of the carrier chrominance signal due to the folding on balanced modulation.

Figure 30:
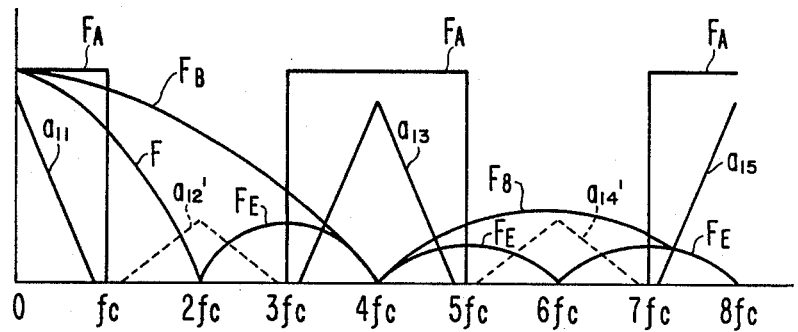
FIG. 30 is a diagram of a frequency spectrum explanatory of operation of the interpolation filter and a comb filter in the arrangement of FIG. 22.

As described above, the crosstalk components are removed from the odd-numbered harmonics (including the fundamental) of the color difference signals, leaving only spectrums $a_{11}$, $a_{13}$, . . . as shown in FIG. 30, and only crosstalk components are picked up from even-numbered harmonics, leaving spectrums $a_{12}'$, $a_{14}'$, . . . . Where the interpolation filters 77a, 77b have ideal characteristics, the stroke components of the even-numbered harmonics can be removed. However, digital interpolation filters fail to remove harmonics having frequencies which are multiples of the frequency fs=4fc of the output data, and have the characteristic curves indicated by the solid lines FA in FIG. 30. Actually, zeroth-order holding characteristics for the frequency fs=4fc of the data are added as indicated by the solid lines FB in FIG. 30, and hence the harmonics are removed by the characteristics represented by the product of FA and FB. If the interpolation filter simply inserts digital data 0 into a portion free of data, then the characteristics are indicated by FB in FIG. 30. Where a zeroth-order interpolation filter is used as with the interpolation filter of FIG. 16, zeroth-order holding chracteristics with a frequency of 2fc are obtained as indicated by the solid lines FE in FIG. 30, the characteristics being highly advantageous since they cut off frequencies at the peaks of the harmonics. Where the interpolation filter for inserting the digital data 0 into the data-free portion is used, a circuit is required for alternately switching between the color difference signal data a or b before being interpolated and the digital data 0. If a low-pass filter having a high harmonics removal rate were added, the circuit would be increased in scale and a delay time due to signal processing would be increased. The zeroth-order holding interpolation filter can however be arranged relatively simply as shown in FIG. 26 since previous data is held and used as data in a data-free portion.

With the chrominance signal reproducing method in FIGS. 22 through 30, interpolated data is inserted in color difference signal data of a low frequency band which is produced by sampling and demodulating a chrominance signal. This can easily achieve the process of adding data which is one horizontal period earlier and stored in the memory or shift register. By thus adding the data which is 1 H earlier, a comb filter which has conventionally been composed of a glass delay line for removing crosstalk components from chrominance signals can be constructed of a semiconductor, resulting in a small-size circuit arrangement. Where a zeroth-order holding circuit is used for inserting interpolated data in the color difference signal data right after thay have been sampled and demodulated, the interpolated data can be inserted with a relatively simple circuit arrangement, and harmonics produced due to sampling can be removed.

The embodiments of FIGS. 22 through 30 have been directed to the reproduction of an NTSC television signal. PAL television signals can be reproduced by replacing the 1-H memories 75a, 75b in FIG. 25 with 2-H memories since the low-range conversion carrier frequency fc of the low-range-converted chrominance signal is expressed by the equation (5):

$$fc = \tfrac{1}{4} f_H (2n_1 - 1)$$

A process of generating a frequency signal from the burst of the low-range-converted chrominance signal will be described, the frequency signal serving as a basis for producing the first clock signal (4Fc in FIG. 4) which is the reference clock signal for the A/D converter and the decoder in FIG. 4, or for producing the low-range conversion carrier fc which is a subcarrier supplied to the terminal 28 in FIGS. 7, 11, and 13. The first clock signal is supplied to the A/D converter 16 and the decoders 17, 74 in FIGS. 4, 18, 20, 21, and 22 for sampling the low-range-converted chrominance signal to demodulate the same, and also is used as a delay clock signal for the 1-H memories 75a, 75b in the comb filters 18a, 18b. Where the first clock signal is supplied as the output signal from the clock generator in the embodiment of FIG. 9 in which the comb filter is composed of a CCD or the like for delaying an analog signal, the delay (1 H or 2 Hs) follows the jitter of the signal $C_L$, resulting in a good comb filter. The first clock signal 4Fc is produced in FIG. 4 as follows: The phases of the burst d' of the low-range-converted chrominanace signal and the pulses Fc generated by the signal generating circuit 22 from the clock signal 4Fc and held in phase with the low-range conversion carrier are conpared with each other. The frequency and phase of the clock signal 4Fc are controlled so that the pulses Fc are held in phase with the low-range-converted burst d', and the low range-converted chrominance signal is sampled by the A/D converter 16 and the decoder 17. A low-range-converted chrominance signal reproduced on a VTR, for example, contains crosstalk from adjacent tracks, and the burst signal from the burst gate 23 has a poor S/N ratio which tends to cause the PLL circuit 24 to operate in error. For removing such crosstalk, a comb filter would be added to the output terminal of the burst gate 23. This arrangement would however be costly.

According to a further embodiment of the present invention, the first clock signal is generated from information on a burst portion of one of color difference signal data which have been demodulated and passed through the comb filters, and any additional filter is not required for clock generation.

Figure 32:
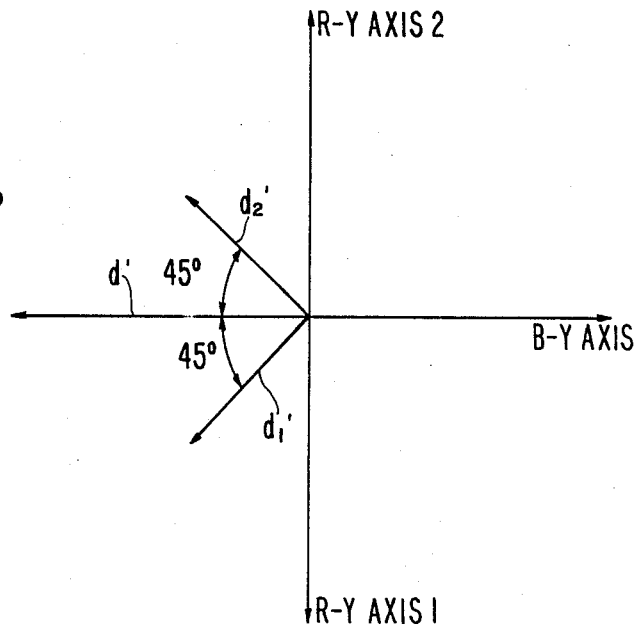
FIG. 32 is a vector diagram showing the relationship between the bursts of low-range-converted chrominance signals in NTSC and PAL signals and a demodulation axis.
Figure 31:
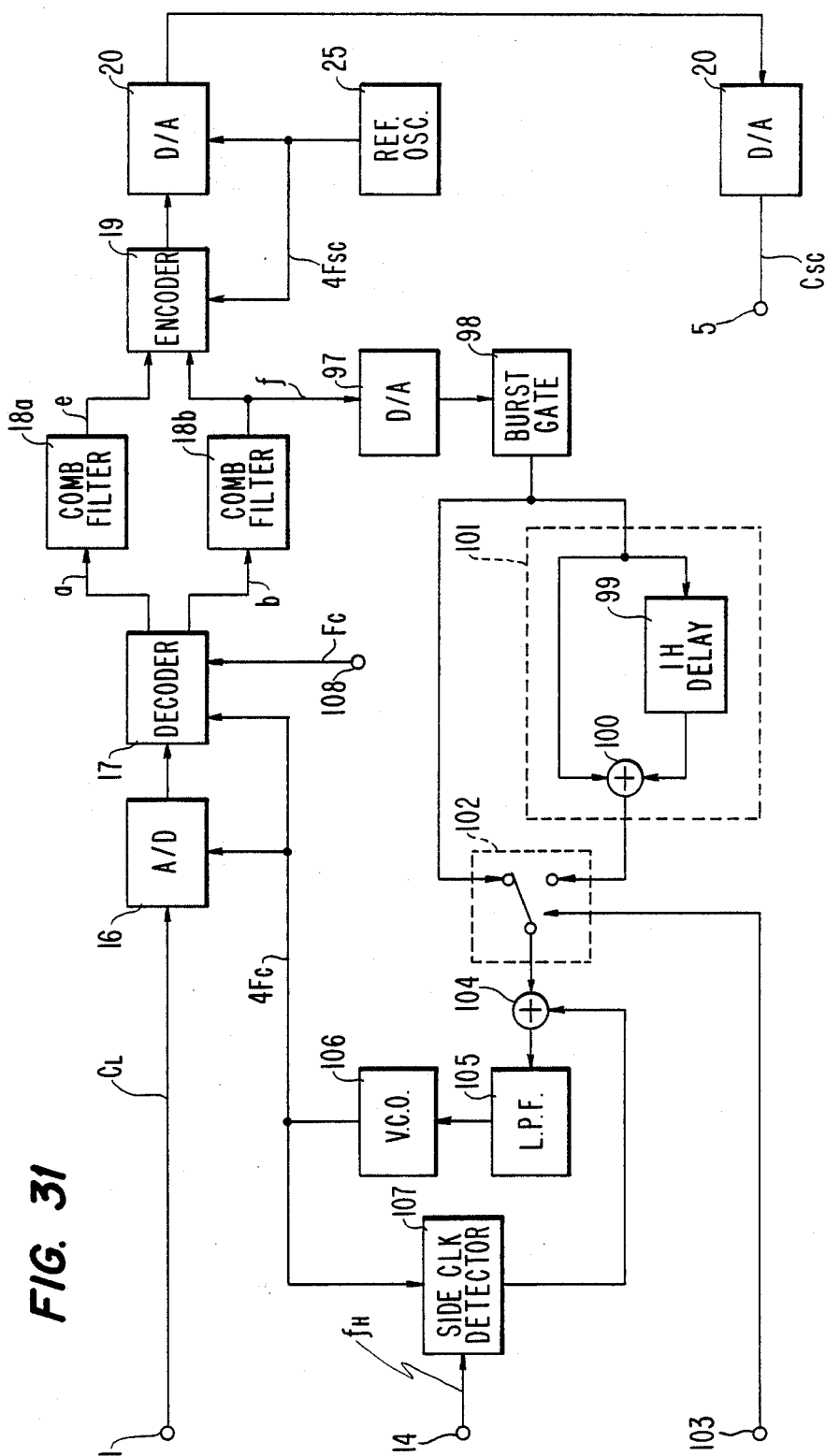
FIG. 31 is a block diagram illustrative of a signal producing method for producing an operation clock signal for an A/D converter and a decoder.

FIG. 31 is a block diagram of an arrangement for generating the first clock signal according to the above embodiment of the invention. A low-range-converted chrominance signal $C_L$ supplied from a terminal 1 is converted by an A/D converter 16 into a digital signal $C_{LS}$ and then demodulated by a decoder 17 into two color difference signal data a, b (B−Y, R−Y; for example). The data a, b are passed through first and second comb filters 18a, 18b which produce data e, f from which crosstalk components from adjacent tracks have been removed, the data e, f being applied to an encoder 19. The encoder 19 converts the data e, f into digital data of a quadrature two-phase modulation chrominance signal based on a second clock signal 4Fsc from a reference oscillator 25, and then the digital data is converted by a first D/A converter 20 into an analog signal which is passed through a bandpass filter to a terminal 5. The above arrangement is the same as that of FIG. 4. The manner in which the fist clock signal (clock signal 4Fc having a frequency 4fc, for example) required by the A/D converter 16 and the decoder 17 is generated will be described hereinbelow. The data f issued from one of the first and second comb filters 18b is converted as an R−Y component of the color difference signal by a second D/A converter 97 into an analog signal. As described above with reference to the vector diagram FIG. 5, where the low-range-converted chrominance signal of an NTSC television signal is demodulated by the A/D converter 16 and the decoder 17 in FIG. 31, analog values converted from the data a, b conincide with the B−Y component a and the R−Y component b in the vector diagram, and the output signals e, f from the comb filters 18a, 18b in FIG. 31 substantially coincide with the data a, b, respectively. Since the burst d' is a signal having a certain magnitude in a negative direction along the B−Y axis, data having a negative value appears as the data a, and nothing appears as the data b. Likewise, data having a negative value appears as the data e, and nothing appears as the data f. Therefore, a signal produced by extracting the output signal from the D/A converter 97 with a burst gate 98 falls to zero. When a signal appears, its value is indicative of a demodulation error of a sampling demodulator composed of the A/D converter 16 and the decoder 17, since the burst and the R−Y axis of the NTSC signal cross perpendicularly each other. FIG. 32 is illustrative of the relationship between the vector directions of R−Y and B−Y of the burst signal and color difference signals in low-range-converted chrominance signals of NTSC and PAL signals. If the B−Y axis is used as a reference, then the low-range-converted burst in the NTSC system has its d'R−Y axis aligned with the R−Y axis 1. The PAL signal is a signal which is a repetition of d1' and d2' in which the burst phases are alternatively repeated between +45° and −45° with respect to a−B−Y axis in respective horizontal periods. For d'1, the R−Y axis 1 serves as the R−Y axis, and for d2', the R−Y axis 2 serves as the R−Y axis. With respect to the PAL signal, therefore, 45° components can be removed by adding an error signal which is 1 H earlier, and the PAL signal can now be handled in the same manner as the NTSC signal. Such processing is performed by a comb filter 101 composed of a 1-H delay line 99 and an adder 100 in FIG. 31. A switch 102 serves to switch between error signals for the PAL and NTSC signals in response to a control signal applied to an input terminal 103. The error signal from an output terminal of the switch 101 is delivered through an adder 104 and a low-pass filter 105 to control a voltage-controlled oscillator 106 which produces an output signal serving as a reference clock signal for the A/D converter 16 and the decoder 17. With the embodiment of FIG. 31, therefore, a feedback loop is formed for making the demodulation axis accurate. Since the burst signal is an intermittent signal supplied in each horizontal period, the voltage-controlled oscillator 106 would be likely to be side-locked at the rate of a frequency spaced $nf_H$ (n is an integer) from the low-range conversion carrier frequency fc if controlled only by the above feedback loop. To avoid this shortcoming, the following processing is introduced: An output signal from the voltage-controlled oscillator 106 is applied to a side-lock detector 107 which counts the output signal from the voltage-controlled oscillator 106 during nH in response to a horizontal synchronizing signal $f_H$ applied from an input terminal 14. The low-range carrier frequency fc is a multiple (forth times in the VHS system) of the horizontal synchronizing frequency $f_H$, and by selecting the frequency of the voltage-controlled oscillator 106 to be a multiple of the low-range carrier frequency, the horizontal synchronizing frequency and the output frequency of the voltage-controlled oscillator 106 are related such that one is a multiple of the other by a positive integer. Therefore, a side lock of the voltage-controlled oscillator 106 can be detected by a count from the side-lock detector 107. An output signal from the side-lock detector 107 is added by the adder 104 to an input terminal of the low-pass filter 105 for preventing a side lock.

The PS and PI processes are coped with as follows: Where the PS process is employed, the demodulation axis of decoder 17 is advanced or delayed 90° in each horizontal H dependent on the field. Where the PI process is used, the demodulation axis is inverted in each field. The above advancing, delaying or inverting of the demodulation axis is effected by supplying a signal (for example, the clock signal Fc having the same period as that of the low-range conversion carrier fc and a constant phase in the embodiments of FIGS. 4, 18, 20, 21, and 22) having data corresponding to the demodulation axis to a terminal 108 for controlling the decoder 17.

Therefore, the chrominance signal processing device of FIG. 31 demodulates a chrominance signal, removes crosstalk from adjacent tracks with the comb filters 18a, 18b, and using information on the burst portion of the R−Y axis as a control voltage for the voltage-controlled oscillator 106 for energizing the A/D converter 16 and the decoder 17 so as to thereby obtain an accurate demodulation axis at all times. The comb filter 18b for removing crosstalk of the color difference signals may double as a comb filter for removing crosstalk from a low-range-converted burst signal which serves as a reference for generating a clock signal in synchronism with the low-range carrier, resulting in a less costly circuit arrangement. Since the low-range-converted chrominance signal is converted into digital data for low-speed digital signal processing, the comb filters can be constructed of a semiconductor and made small in size so that they consume a reduced amount of electric power and can be fabricated as ICs. By passing an error signal in a PAL signal through the third comb filter 101, the PAL signal can also be processed. Therefore, switching between the NTSC and PAL signals can easily be effected. The side-lock detector 107 can prevent the reference clock signal for the A/D converter 16 and the decoder 17 from being subjected to a side lock.

In the embodiment of FIG. 31, the second D/A converter 97, the burst gate 98, the third comb filter 101 may be arranged in any desired order. For example, the D/A converter 97 may be positioned after the burst gate 98 and the third comb filter 101 to allow the latter two to be constructed of digital circuits. The burst gate 98 may be positioned prior to the D/A converter 97 and the third comb filter 101. The latter alternative is advantageous in that where the third comb filter is composed of a memory or a shift register, the data to be delayed may be data present only in a burst interval, and the number of devices used may be reduced.

Although certain preferred embodiments have been shown and described, it should be understood that many changes and modifications may be made therein without departing from the scope of the appended claims.

What is claimed is:

1. A method of reproducing a carrier chrominance signal with a carrier having a prescribed carrier frequency from a low-range-converted chrominance signal with a carrier having a low-range-converted carrier frequency, comprising the steps of:

demodulating said low-range-converted chrominance signal to obtain two color difference signals;

filtering said two color difference signals for eliminating even order harmonic components of said two color difference signals and noise components, said filtering step comprising the steps of: delaying said two color difference signals by a predetermined time; and adding said two color difference signals and the delayed two color difference signals, respectively;

sampling and holding said two color difference signals after they have been filtered at a predetermined sampling frequency to eliminate high frequency components having frequencies outside of a frequency range of said two color difference signals; and modulating said two color difference signals after they have been filtered so as to obtain said carrier chrominance signal.

2. A method according to claim 1, wherein said demodulating step comprises the steps of: multiplying said low-range-converted chrominance signal by a first oscillation signal having said low-range-converted carrier frequency to obtain one of said two color difference signals; and multiplying said low-range-converted chrominance signal by a second oscillation signal having said low-range-converted carrier frequency and a phase shifted by 90° from that of said first oscillation signal to obtain the other of said two color difference signals.

3. A method according to claim 1, wherein said modulating step comprises the steps of: multiplying one of said two color difference signals after they have been filtered by a first oscillation signal having said prescribed carrier frequency to obtain a first modulated signal; multiplying the other of said two color difference signals after they have been filtered by a second oscillation signal having said prescribed carrier frequency and a phase shifted by 90° from that of said first oscillation signal to obtain a second modulated signal; and mixing said first and second modulated signals to obtain said carrier chrominace signal.

4. A method of reproducing a carrier chrominance signal with a carrier having a prescribed carrier frequency $f_{SC}$ from a low-range-converted chrominance signal with a carrier having a low-range-converted carrier frequency $f_C$, comprising the steps of:

sampling said low-range-converted chrominance signal at a frequency $nf_C$ to obtain a sampled low-range-converted chrominance signal, where n is an integer;

decoding said sampled low-range-converted chrominance signal using an oscillation signal having said frequency $f_C$ and a phase which has a predetermined relationship to that of the carrier of said low-range-converted chrominance signal to obtain two color difference signals;

filtering said two color difference signals for eliminating even order harmonic components of said two color difference signals and noise components, said filtering step comprising the steps of: delaying said two color difference signals by a predetermined time; and adding said two color difference signals and the delayed two color difference signals, respectively;

sampling said two color difference signals after they have been filtered at a frequency $mf_{SC}$ to obtain two sampled color difference signals, where m is an integer; and encoding said two sampled color difference signals using an oscillation signal having said frequency $f_{SC}$ to obtain said carrier chrominance signal.

5. A method according to claim 4, wherein said oscillation signal having said frequency $nf_C$ is produced by the steps of: extracting a burst signal from one of said two color difference signals; producing a DC signal corresponding to a level of said burst signal from said burst signal; and producing a voltage-controlled oscillation signal whose frequency is proportional to said DC signal, said voltage-controlled oscillation signal being said oscillation signal having said frequency $nf_C$.

6. A method of reproducing a carrier chrominance signal with a carrier having a prescribed carrier frequency $f_{SC}$ from a low-range-converted chrominance signal with a carrier having a low-range-converted carrier frequency $f_C$, comprising the steps of:
- sampling said low-range-converted chrominance signal at a sampling frequency $4f_C$ to obtain a sampled low-range-converted chrominance signal;
- inverting said sampled low-range-converted chrominance signal at cycles of $2f_C$ to obtain an alternately inverting low-range-converted chrominance signal which alternately inverts at intervals of $1/(2f_C)$;
- sampling said alternately inverting low-range-converted chrominance signal with a first clock signal having a frequency $2f_C$ and a second clock signal having said frequency $2f_C$ and a phase shifted by 180° from that of said first clock signal to obtain two color difference signals;
- filtering said two color difference signals for eliminating even order harmonic components of said two color difference signals and noise components, said filtering step comprising the steps of: delaying said two color difference signals by a predetermined time; and adding said two color difference signals and the delayed two color difference signals, respectively;
- sampling said two color difference signals after they have been filtered at a sampling frequency $4f_{SC}$ to obtain two sampled color difference signals; and
- encoding said sampled two color difference signals using an oscillation signal having said frequency $f_{SC}$ to obtain said carrier chrominance signal.

7. A method according to claim 6, further comprising a step, between said sampling step for obtaining said two color difference signals and said filtering step, of interpolating said two color difference signals to obtain two color difference signals each having a sampled frequency $4f_C$.

8. A method of reproducing a carrier chrominance signal with a carrier having a prescribed carrier frequency $f_{SC}$ from a low-range-converted chrominance signal with a carrier having a low-range-converted carrier frequency $f_C$, comprising the steps of:
- sampling said low-range-converted chrominance signal at a sample frequency $4f_C$ to obtain a sampled low-range-converted chrominance signal;
- inverting said sampled low-range-converted chrominance signal at cycles of $2f_C$ to obtain an alternately inverting low-range-converted chrominance signal which alternately inverts at intervals of $1/(2f_C)$;
- sampling and holding said alternately inverting low-range-converted chrominance signals with a first clock signal having a frequency $2f_C$ and a second clock signal having said frequency $2f_C$ and a phase shifted by 180° from that of said first clock signal to obtain two color difference signals each having a sampled frequency $2f_C$;
- sampling the sampled and held two color difference signals each having said sampled frequency $2f_C$ at a sampling frequency $4f_C$ to obtain two color difference signals each having a sampled frequency $4f_C$;
- filtering said two color difference signals sampled at said sampling frequency $4f_C$ for eliminating even order harmonic components of said two color difference signals and noise components, said filtering step comprising the steps of: delaying said two color difference signals by a predetermined time; and adding said two color difference signals and the delayed two color difference signals, respectively;
- sampling said two color difference signals after they have been filtered at a sampling frequency $4f_{SC}$ to obtain two further sampled color difference signals; and
- encoding said two further sampled color difference signals using an oscillation signal having said frequency $f_{SC}$ to obtain said carrier chrominance signal.

9. A method of reproducing two color difference signals from a low-range-converted chrominance signal with a carrier having a low-range-converted carrier frequency, comprising the steps of:
- demodulating said low-range-converted chrominance signal to obtain two color difference signals; and
- filtering said two color difference signals for eliminating even order harmonic components of said two color difference signals and noise components, said filtering step comprising the steps of: delaying said two color difference signals by a predetermined time; and adding said two color difference signals and the delayed two color difference signals, respectively; and
- sampling and holding said two color difference signals after they have been filtered at a predetermined sampling frequency to eliminate high frequency components having frequencies outside of a frequency range of said two color difference signals.

10. A method according to claim 9, wherein said demodulating step comprises the steps of: multiplying said low-range-converted chrominance by a first oscillation signal having said low-range-converted carrier frequency to obtain one of said two color difference signals; and multiplying said low-range-converted chrominance signal by a second oscillation signal having said low-range-converted carrier frequency and a phase shifted by 90° from that of said first oscillation signal to obtain the other of said two color difference signals.

11. A method of reproducing two color difference signals from a low-range-converted chrominance signal with a carrier having a low-range-converted carrier frequency $f_C$, comprising the steps of:
- sampling said low-range-converted chrominance signal at a sampling frequency $4f_C$ to obtain a sampled low-range-converted chrominance signal;
- inverting said sampled low-range-converted chrominance signal at cycles of $2f_C$ to obtain an alternately inverting low-range-converted chrominance signal which alternately inverts at intervals of $1/(2f_C)$;
- sampling said alternately inverting low-range-converted chrominance signal with a first clock signal having a frequency $2f_C$ and a second clock signal having said frequency $2f_C$ and a phase shifted by 180° from that of said first clock signal to obtain two color difference signals; and filtering said two color difference signals for eliminating even order harmonic components of said two color difference signals and noise components, said filtering step comprising the steps of: delaying said two color difference signals by a predetermined time; and adding said two color difference signals and the delayed two color difference signals, respectively.

12. A method according to claim 11, further comprising a step, between said sampling step and said filtering step, of interpolating said two color difference signals to obtain two color difference signals each having a sampled frequency $4f_C$.

13. A method of reproducing two color difference signals from a low-range-converted chrominance signal with a carrier having a low-range-converted carrier frequency $f_C$, comprising the steps of:

sampling said low-range-converted chrominance signal at a sampling frequency $4f_C$ to obtain a sampled low-range-converted chrominance signal;

inverting said sampled low-range-converted chrominance signal at cycles of $2f_C$ to obtain an alternately inverting low-range-converted chrominance signal which alternately inverts at intervals of $1/(2f_C)$;

sampling and holding said alternately inverting low-range-converted chrominance signal with a first clock signal having a frequency $2f_C$ and a second clock signal having said frequency $2f_C$ and a phase shifted by 180° from that of said first clock signal to obtain two color difference signals each having a sampled frequency $2f_C$;

sampling the sampled and held two color difference signals each having said sampled frequency $2f_C$ at a sampling frequency $4f_C$ to obtain two color difference signals each having a sampled frequency $4f_C$; and filtering said two color difference signals sampled at said sampling frequency $4f_C$ for eliminating even order harmonic components of said two color difference signals and noise components, said filtering step comprising the steps of: delaying said two color difference signals by a predetermined time; and adding said two color difference signals and the delayed two color difference signals, respectively.

* * * * *